US012454133B2

(12) United States Patent
Miyazawa et al.

(10) Patent No.: US 12,454,133 B2
(45) Date of Patent: Oct. 28, 2025

(54) LIQUID CONTAINER

(71) Applicant: SEIKO EPSON CORPORATION, Tokyo (JP)

(72) Inventors: Seigo Miyazawa, Shiojiri (JP); Taku Ishizawa, Matsumoto (JP); Atsushi Kobayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 137 days.

(21) Appl. No.: 18/389,958

(22) Filed: Dec. 20, 2023

(65) Prior Publication Data

US 2024/0208237 A1 Jun. 27, 2024

(30) Foreign Application Priority Data

Dec. 21, 2022 (JP) ................................ 2022-204121

(51) Int. Cl.
*B41J 2/175* (2006.01)

(52) U.S. Cl.
CPC ....... *B41J 2/17553* (2013.01); *B41J 2/17513* (2013.01)

(58) Field of Classification Search
CPC .. B41J 2/17553; B41J 2/17513; B41J 2/1752; B41J 2/17523; B41J 2/1753
USPC ........................................................... 347/86
See application file for complete search history.

(56) References Cited

U.S. PATENT DOCUMENTS

2002/0109761 A1* 8/2002 Shimizu ................ B41J 2/1755 347/50
2015/0022599 A1* 1/2015 Nozawa .............. B41J 2/17536 347/86

FOREIGN PATENT DOCUMENTS

JP 2004-050471 A 2/2004

* cited by examiner

*Primary Examiner* — Jason S Uhlenhake
*Assistant Examiner* — Alexander D Shenderov
(74) *Attorney, Agent, or Firm* — Oliff PLC

(57) ABSTRACT

A plurality of liquid containers configured to be attached to the same liquid consuming apparatus in an exchangeable manner is provided. The liquid containers each include a housing that surrounds at least a part of a liquid containing chamber containing a liquid in the liquid container and is exposed to the outside of the liquid container. A first type liquid container of the plurality of liquid containers includes a rib that projects from an outer surface of the housing. A second type liquid container of the plurality of liquid containers does not include the rib.

3 Claims, 25 Drawing Sheets

LIQUID CONTAINER

The present application is based on, and claims priority from JP Application Serial Number 2022-204121, filed Dec. 21, 2022, the disclosure of which is hereby incorporated by reference herein in its entirety.

BACKGROUND

1. Technical Field

The present disclosure is related to a liquid container.

2. Related Art

In the related art, there has been a technique of refilling an ink tank, with ink, that is used and attached to a printer. In the technique of JP-A-2004-50471, based on the existence of an injection needle hole that is formed at the time of ink refilling, it is detected that the ink tank has been already refilled. In addition, the ink tank that has been already refilled is not refilled more than once.

On the other hand, there is an ink tank that should not be refilled with ink due to the properties of the ink contained in the ink tank.

In JP-A-2004-50471, a method of confirming the existence of an injection needle hole of the ink tank is not specifically considered. The hole that is made for ink refilling is closed after the ink tank is refilled with ink. Therefore, a hole as small as possible is made in the ink tank at the time of ink refilling. Therefore, for example, during a visual inspection by a human being, an injection needle hole existing in the ink tank may be overlooked. In addition, in an aspect in which image processing is performed to confirm the existence of an injection needle hole, an injection needle hole existing in the ink tank may be overlooked. Moreover, an ink tank that has not been refilled but should not be refilled with ink needs to be distinguished from an ink tank that should be refilled with ink.

SUMMARY

According to an aspect of the present disclosure, a plurality of liquid containers configured to be attached to the same liquid consuming apparatus in an exchangeable manner is provided. The liquid containers each have a housing that surrounds at least a part of a liquid containing chamber containing a liquid in the liquid container and is exposed to the outside of the liquid container. A first type liquid container of the plurality of liquid containers includes a rib that projects from an outer surface of the housing. A second type liquid container of the plurality of liquid containers does not include the rib.

DESCRIPTION OF EMBODIMENTS

A. Embodiment

A1. Configuration of Liquid Container

Figure 1:
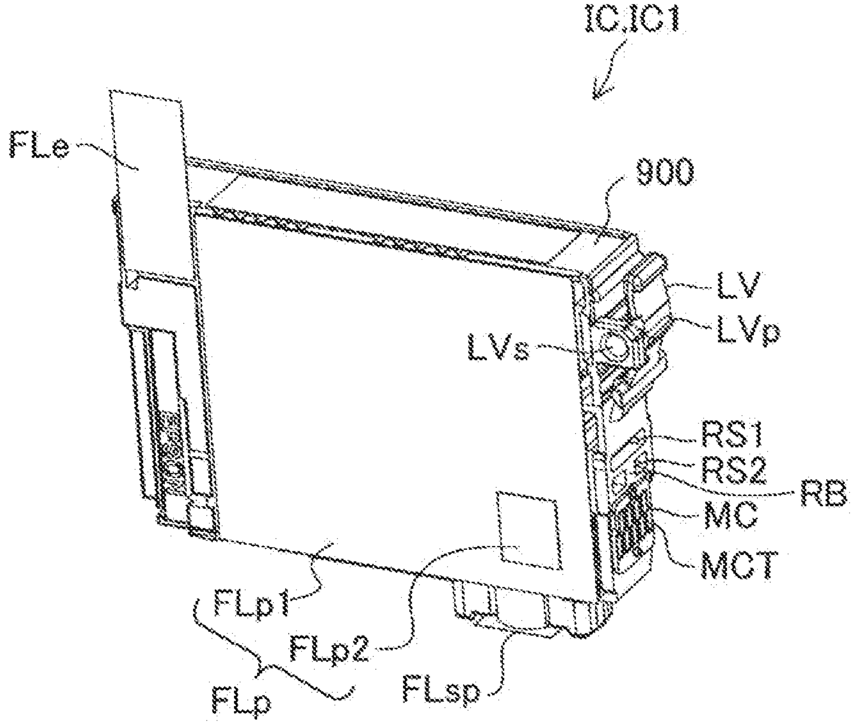
FIG. 1 is a perspective view of a liquid container according to the present embodiment.

FIG. 1 is a perspective view illustrating a liquid container IC1 according to the present embodiment. In the present embodiment, a plurality of liquid containers IC1 and IC2 that can be attached to the same printer PRT in an exchangeable manner will be described. When a liquid container is mentioned without distinguishing the liquid containers IC1 and IC2, the liquid container is referred to as a liquid container IC.

FIG. 1 illustrates the first type liquid container IC1 of the liquid containers IC1 and IC2. The first type liquid container IC1 is a liquid container to be refilled with ink after the liquid container IC1 is used. On the other hand, the second type liquid container IC2 is not refilled with ink after the liquid container IC2 is used. The second type liquid container IC2 will be described later.

The liquid container IC1 contains ink inside. The liquid container IC1 is mounted to the printer PRT and supplies ink to the printer PRT. The liquid container IC1 includes a housing 900 having a rectangular parallelepiped external shape. The housing 900 surrounds a part of liquid containing chambers 117 and 121 that contain ink in the liquid container IC1. A part of the housing 900 is exposed to the outside of the liquid container IC1. The housing 900 is made of polypropylene. In the following description, based on the orientation when the liquid container IC is mounted to the printer PRT and used, terms of a "bottom surface", an "upper surface", and a "side surface" are used regarding the liquid container IC and the housing 900.

In the orientation of the liquid container IC1 when mounted to the printer PRT and used, the liquid container IC1 includes a memory chip MC in one of outer surfaces corresponding to side surfaces (see the lower right portion of FIG. 1). The memory chip MC includes nine terminals MCT. The respective nine terminals MCT are in contact with respective nine terminals provided in the printer PRT so as to be electrically coupled. The nine terminals of the printer PRT are electrically coupled to a control circuit of the printer PRT.

Figure 2:
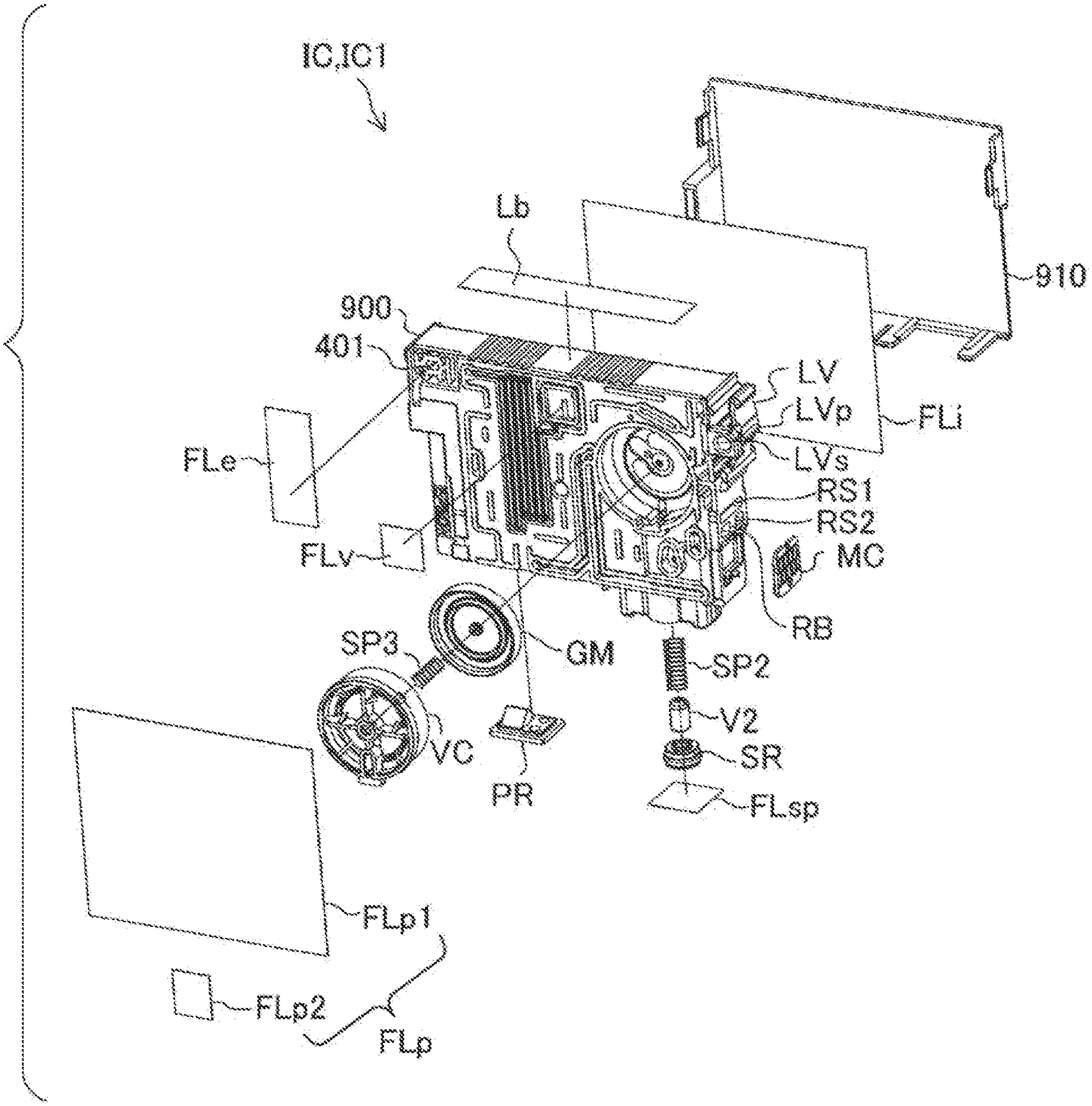
FIG. 2 is an exploded perspective view of the liquid container according to the present embodiment.

FIG. 2 is an exploded perspective view of the liquid container IC1 according to the present embodiment. The liquid container IC1 includes a rubber film GM, a coil spring SP3, and a valve cover VC inside (see the central portion of FIG. 2). The rubber film GM, the coil spring SP3, and the valve cover VC are overlapped in this order in the liquid container IC1 to constitute a differential pressure valve 325. The differential pressure valve 325 will be described later.

The liquid container IC1 includes a coil spring SP2, a valve V2, a seal rubber SR, and a supply port film FLsp in a portion near the bottom surface of the housing 900 and near the side surface to which the memory chip MC is attached (see the central portion of FIG. 2). The coil spring SP2, the valve V2, and the seal rubber SR are disposed in this order in a liquid supply path 300 near a liquid supply port 200. The supply port film FLsp seals the liquid supply port 200. The supply port film FLsp is peeled from the housing 900 when the liquid container IC1 is used.

The liquid container IC1 includes a prism PR in a portion of the bottom surface of the housing 900 and near a side surface facing the side surface to which the memory chip MC is attached (see the central portion of FIG. 2). A part of the prism PR is exposed inside a liquid containing chamber 121 in the liquid container IC1. The prism PR reflects light emitted from the printer PRT so as to provide information on the amount of ink in the liquid containing chamber 121 to the printer PRT.

The liquid container IC1 includes an air release port 401 in a portion, of a side surface that is a side surface of the housing 900 and is a side surface coupled to the side surface to which the memory chip MC is attached, near the side surface facing the side surface to which the memory chip MC is attached (see the upper left portion of FIG. 2). The air release port 401 introduces air into the liquid containing chambers 117 and 121.

In a state before the liquid container IC1 is used, the air release port 401 is sealed with a sealing film FLe that can be peeled (see the upper left portion of FIG. 1). The sealing film FLe has a layer of a urethane-based adhesive that can be peeled on a surface. The sealing film FLe is adhered to the housing 900 with the urethane-based adhesive in a peelable manner. The sealing film FLe does not allow ink contained in the liquid containing chambers 117 and 121 in the liquid container IC1 to pass therethrough.

With such a configuration, in the state before the use of the liquid container IC1 is started, the ink that flows out to a portion further on the air release port 401 side than is a capturing portion 4C in an air introducing path 400 can be prevented from flowing out to the outside through the air release port 401. Note that the configuration and functions of the capturing portion 4C will be described later.

The sealing film FLe is peeled from the housing 900 when the liquid container IC1 is used. That is, the air release port 401 is opened. The air release port 401 allows air to pass between the outside of the liquid container IC1 and the liquid containing chambers 117 and 121 through the air introducing path 400. As a result, the ink can be appropriately supplied from the liquid containing chambers 117 and 121 to the liquid supply port 200.

Other portions of the side surface of the housing 900 to which the sealing film FLe is adhered are sealed by a partition wall film FLp (see the lower left portion of FIG. 1 and the lower left portion of FIG. 2). Note that in the liquid container IC1 before use, the partition wall film FLp is configured with a first partition wall film FLp1. In a state in which the liquid container IC1 is refilled with ink after the liquid container IC1 is used, the partition wall film FLp is configured with the first partition wall film FLp1 and a second partition wall film FLp2 (see the lower left portion of FIG. 2 and the lower right portion of FIG. 1). The second partition wall film FLp2 seals a hole provided in the first partition wall film FLp1 at the time of ink refilling.

A side surface facing the side surface of the housing 900 to which the sealing film FLe is adhered is sealed by an inner film FLi (see the upper right portion of FIG. 2). The side surface sealed by the inner film FLi is further covered with a cover 910.

A label Lb is adhered to the top surface of the housing 900 (see the upper central portion of FIG. 2). Information indicating the ink color contained in the liquid container IC1 is printed on the label Lb.

Figure 3:
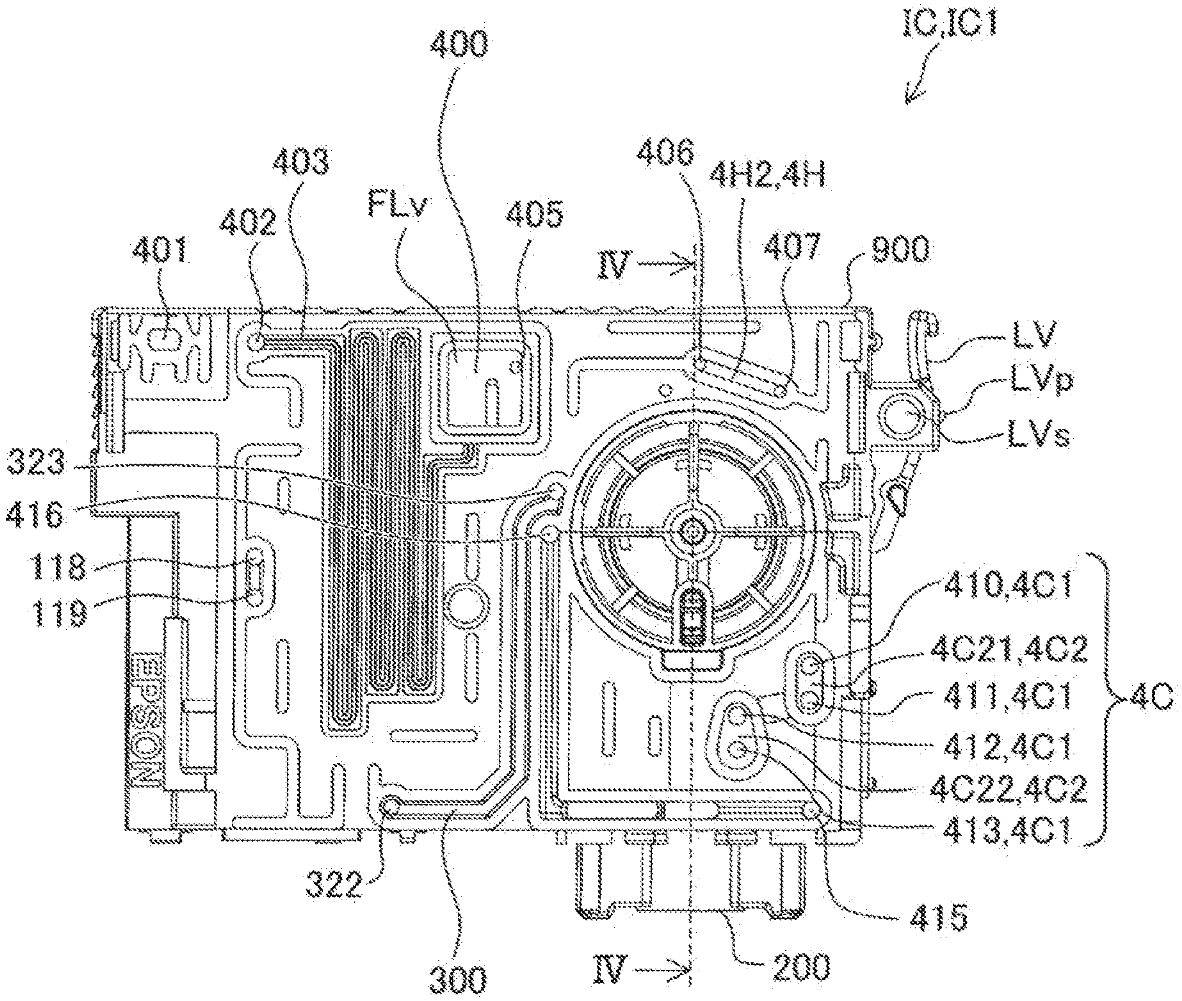
FIG. 3 is a side view of the liquid container viewed in substantially the same direction as FIGS. 1 and 2.
Figure 4:
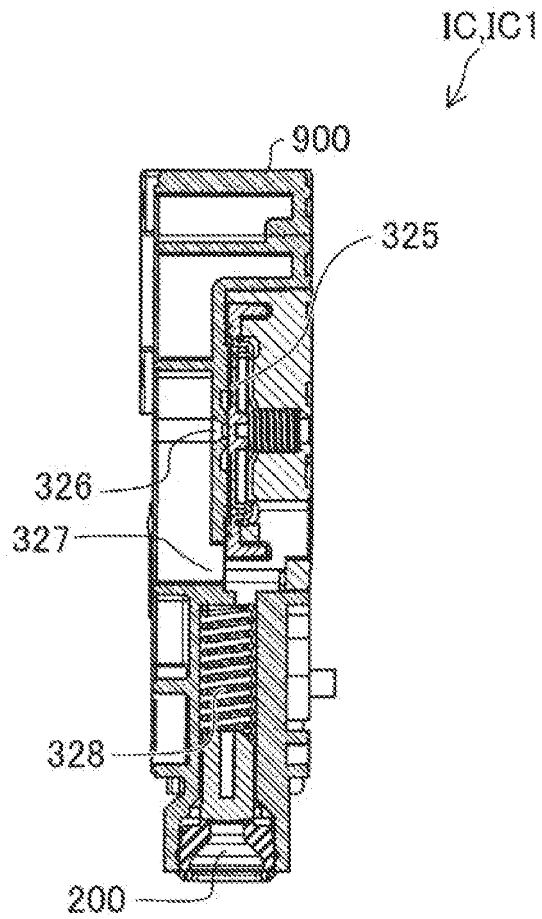
FIG. 4 is a sectional view taken along IV-IV of FIG. 3.
Figure 5:
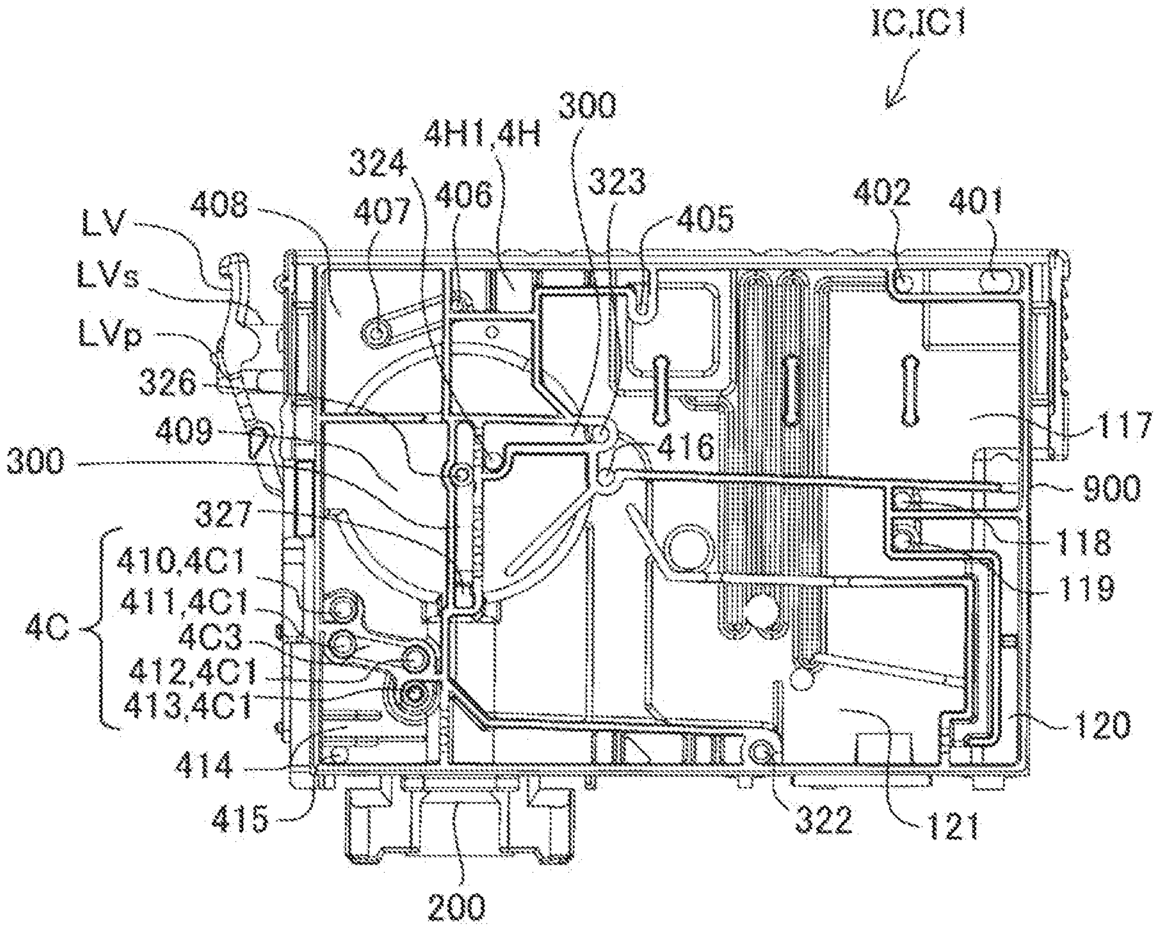
FIG. 5 is a side view of the liquid container viewed in an opposite direction of FIG. 3.
Figure 6:
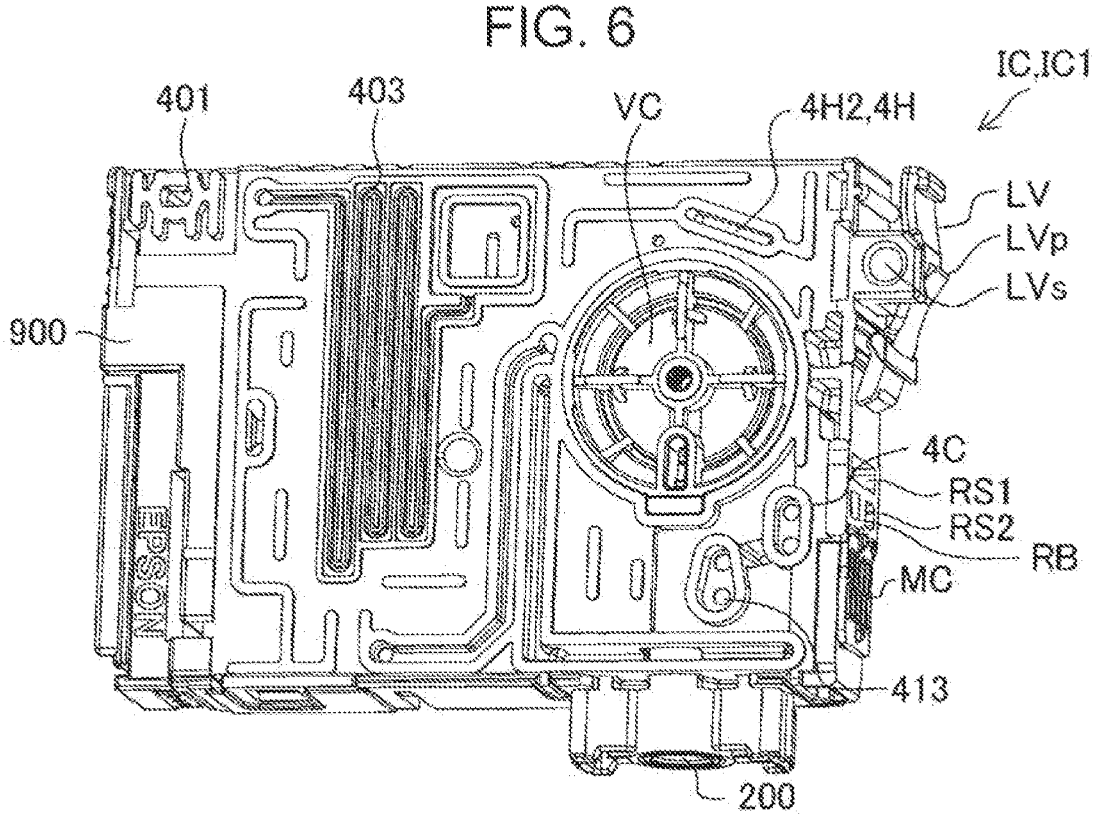
FIG. 6 is a perspective view illustrating the liquid container in a state in which a sealing film, a partition wall film, and the like are not adhered.

FIG. 3 is a side view of the liquid container IC1 viewed in substantially the same direction as FIGS. 1 and 2. FIG. 4 is a sectional view taken along IV-IV of FIG. 3. FIG. 5 is a side view of the liquid container IC1 viewed in an opposite direction of FIG. 3. FIG. 6 is a perspective view illustrating the liquid container IC1 in a state in which the sealing film FLe, the partition wall film FLp, a ventilation film FLv, and the supply port film FLsp are not adhered.

The liquid container IC1 includes the liquid containing chambers 117 and 121, the liquid supply port 200, the liquid supply path 300, the air release port 401, and the air introducing path 400.

The liquid containing chambers 117 and 121 are provided in the housing 900 and contain ink (see the upper right portion and the lower right portion of FIG. 5). A part of the liquid containing chambers 117 and 121 is defined by the housing 900, another part is defined by the inner film FLi (see the central portion and the upper right portion of FIG. 2). The liquid containing chambers 117 and 121 are coupled by a communication path 120 provided in the liquid container IC1. Specifically, the communication path 120 causes the ink received from the liquid containing chamber 117 to pass through communication holes 118 and 119 and supplies the ink to the liquid containing chamber 121 (see the middle left portion of FIG. 3 and the middle right portion of FIG. 5).

The liquid supply port 200 is provided on the bottom surface of the housing 900 (see the lower right portion of FIG. 3, the lower left portion of FIG. 5, and the lower right portion of FIG. 6). The liquid supply port 200 supplies the ink in the liquid containing chambers 117 and 121 to the outside of the liquid container IC1.

The liquid supply path 300 is provided in the housing 900. The liquid supply path 300 couples the liquid supply port 200 to the liquid containing chambers 117 and 121. Specifically, the liquid supply path 300 causes the ink received from the liquid containing chamber 121 to pass through communication holes 322, 323, 324, 326, and 327, and a channel portion 328 and supplies the ink to the liquid supply port 200 (see the lower central portion and the middle left portion of FIG. 5, and FIG. 4).

The liquid supply path 300 includes the differential pressure valve 325 (see the upper section of FIG. 4). The differential pressure valve 325 is composed of a wall portion constituting the housing 900, the rubber film GM, the coil spring SP3, and the valve cover VC (see the central portion of FIG. 2). The differential pressure valve 325 allows the liquid supply path 300 to be electrically conducted when downstream pressure which is pressure of a channel portion of the liquid supply path 300 between the differential pressure valve 325 and the liquid supply port 200 is smaller than upstream pressure which is pressure of a channel portion of the liquid supply path 300 between the differential pressure valve 325 and the liquid containing chambers 117 and 121, and the difference between the downstream pressure and the upstream pressure is larger than a predetermined value. The differential pressure valve 325 blocks the liquid supply path 300 when the difference between the downstream pressure and the upstream pressure is smaller than the above-described predetermined value, or the downstream pressure is larger than the upstream pressure.

With such a configuration, the ink can be appropriately supplied from the liquid containing chambers 117 and 121 toward the liquid supply port 200, and a flow of the ink in the reverse direction can be prevented.

The air introducing path 400 is provided in the housing 900 (see the upper section of FIG. 3). The air introducing path 400 couples the air release port 401 to the liquid containing chambers 117 and 121. Specifically, the air introducing path 400 introduces air through the air release port 401, causes the air to pass through the communication holes 402, 405, 406, 407, 415, and 416, and supplies the air to the liquid containing chamber 117 (see the upper section of FIG. 3 and the upper section of FIG. 5).

The air introducing path 400 includes a bent channel portion 403, a barrier channel portion 4H, air chambers 408 and 409, the capturing portion 4C, and an air chamber 414 in order from the air release port 401 toward the liquid containing chamber 117 (see FIGS. 3 and 5).

The capturing portion 4C constitutes a part of the air introducing path 400 (see the lower right portion of FIG. 3, the lower left portion of FIG. 5, and the lower right portion of FIG. 6). The capturing portion 4C exhibits a function of capturing ink that has entered the air introducing path 400. The configuration of the capturing portion 4C will be described later.

The air introducing path 400 is closed by the ventilation film FLv in a portion further on the air release port 401 side than is the capturing portion 4C (see the upper central portion of FIG. 3). The ventilation film FLv is welded to an upper end of a wall surrounding the communication hole 405 and lower than wall portions around the wall, and separates a space surrounded by the wall from a space surrounding the wall. The ventilation film FLv is formed of a material that allows air to pass therethrough and does not allow the ink contained in the liquid containing chambers 117 and 121 to pass therethrough. Specifically, the ventilation film FLv is formed of a film having micropores having such a size that molecules of oxygen or nitrogen, which is gas, is allowed to pass, and molecules of liquid is not allowed to pass.

With such a configuration, in the air introducing path 400, the ink that flows out to a portion further on the air release port 401 side than is the capturing portion 4C can also be prevented from flowing out to the outside through the air release port 401.

The barrier channel portion 4H is located in a portion between the capturing portion 4C and the ventilation film FLv in the air introducing path 400. The barrier channel portion 4H is located vertically above the capturing portion 4C in an orientation of the liquid container IC1 when the ink is supplied from the liquid supply port 200 of the liquid container IC1 to the outside. Specifically, the barrier channel portion 4H is a channel portion 4H1 between the communication hole 405 and the communication hole 406, and a channel portion 4H2 between the communication hole 406 and the communication hole 407 (see the upper left portion of FIG. 5, the upper right portion of FIG. 3, and the upper right portion of FIG. 6).

With such a configuration, even when there is ink that has passed through the capturing portion 4C, the ink does not reach the ventilation film FLv unless the ink goes upward against the gravity and crosses the barrier channel portion 4H located vertically above. Therefore, the possibility that the ink that has passed the capturing portion 4C comes into contact with the ventilation film FLv can be reduced. As a result, the possibility that air cannot flow in the air introducing path 400 due to the entire ventilation film FLv getting wet with the ink can be reduced.

The bent channel portion 403 is located between the capturing portion 4C and the ventilation film FLv in the air introducing path 400 (see the upper left portion of FIG. 3 and the upper left portion of FIG. 6). The bent channel portion 403 includes a pair of channel portions that has a smaller sectional area than those of the channel portions before and after and causes air to flow in different directions from each other by 180°. In the present embodiment, the bent channel portion 403 includes three pairs of such channel portions. Note that the air introducing path 400 does not include the bent channel portion 403 described above between the capturing portion 4C and the liquid containing chambers 117 and 121.

With such a configuration, the evaporation amount of volatile components in the ink in the liquid containing chambers 117 and 121 through the air introducing path 400 can be reduced.

The air chambers 408, 409, and 414 are chambers that retain air in the middle of the air introducing path 400 (see upper left portion and the lower left portion of FIG. 5).

Figure 7:
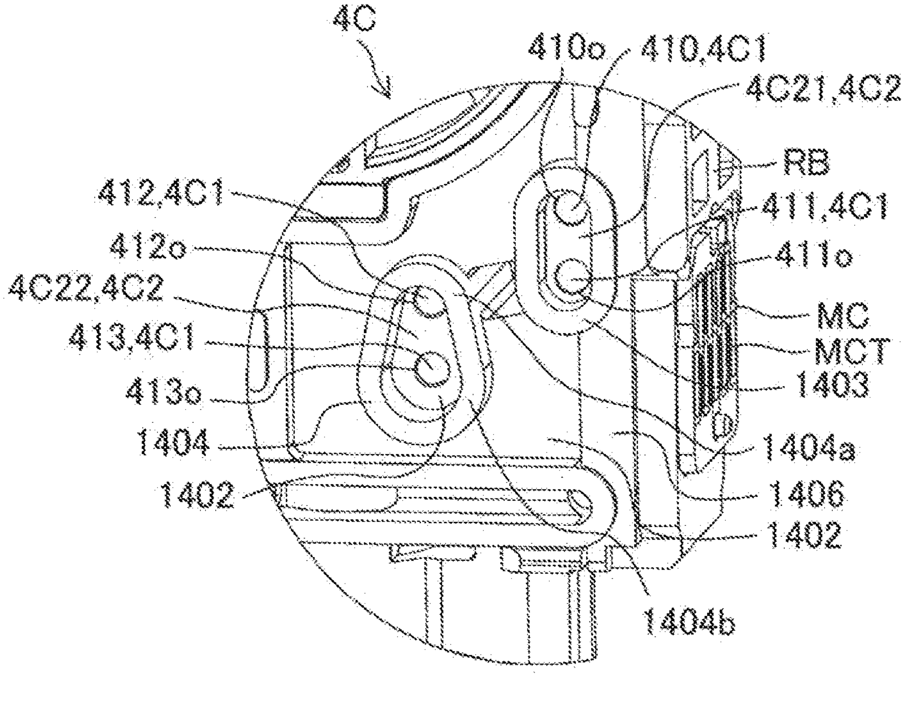
FIG. 7 is an enlarged view illustrating a portion near a capturing portion in an enlarged manner.

FIG. 7 is an enlarged view illustrating a portion near the capturing portion 4C illustrated in FIGS. 3 and 6 in an enlarged manner. The capturing portion 4C constitutes a part of the air introducing path 400. The capturing portion 4C includes a first region 4C1, a second region 4C2, and a third region 4C3.

The first region 4C1 is specifically four columnar spaces 410, 411, 412, and 413. The columnar spaces 410, 411, 412, and 413 extend in a direction parallel to each other. The columnar spaces 410, 411, 412, and 413 extend in a direction that coincides with a horizontal direction in an orientation when the liquid container IC1 is mounted to the printer PRT and used. The columnar spaces 410, 411, 412, and 413 are also each called a "first region". Air introduced from the air release port 401 passes through the first regions 410, 411, 412, and 413 in order in the capturing portion 4C.

The second region 4C2 is provided on a side facing the first partition wall film FLp1 in the housing 900 (see FIG. 2 and the lower right portion of FIG. 3). The second region 4C2 is channel portions 4C21 and 4C22 that extend in a different direction from the first region 4C1. More specifically, the channel portions 4C21 and 4C22 extend in a direction perpendicular to the direction in which the first regions 410, 411, 412, and 413 extend. The channel portions 4C21 and 4C22 extend in a direction coincides with the vertical direction in the orientation when the liquid container IC1 is mounted to the printer PRT and used. The channel portions 4C21 and 4C22 are also each called a "second region".

The second region 4C21 is coupled to the first region 410 through a circular opening 410*o* provided in a wall portion 1402 constituting a part of the liquid container IC1 and having a circular external shape (see the upper right portion of FIG. 7). The second region 4C21 is coupled to the first region 411 through a circular opening 411*o* provided in the wall portion 1402 and having a circular external shape.

The second region 4C21 is defined by the wall portion 1402, a surrounding wall 1403, and the partition wall film FLp (see the upper right portion of FIG. 7). The wall portion 1402 is a wall portion provided with the circular opening 410*o* among the components of the housing 900. The surrounding wall 1403 is a wall portion projecting from the wall portion 1402. The surrounding wall 1403 surrounds the circular opening 410*o*. The partition wall film FLp is bonded to an upper end of the surrounding wall 1403. The partition wall film FLp separates a space surrounded by the surrounding wall 1403 from the outside of the liquid container IC1 (see the lower left portion of FIG. 2). Note that for easy understanding of the technique, in FIG. 7, the partition wall film FLp is not illustrated.

The second region 4C22 is coupled to the first region 412 through a circular opening 412*o* provided in the wall portion 1402 and having a circular external shape (see the middle left portion of FIG. 7). The second region 4C22 is coupled to the first region 413 through a circular opening 413*o* provided in the wall portion 1402 constituting a part of the liquid container IC1 and having a circular external shape. Since the circular opening 413*o* has such a configuration, the circular opening 413*o* can exchange ink with the second region 4C2 regardless of the orientation of the liquid container IC1.

The second region 4C22 is defined by the wall portion 1402, a surrounding wall 1404, and the partition wall film FLp (see the middle left portion of FIG. 7). The wall portion 1402 is a wall portion provided with the circular opening 412*o* among the components of the housing 900. The surrounding wall 1404 is a wall portion projecting from the wall portion 1402. The surrounding wall 1404 surrounds the circular opening 412*o*.

The surrounding wall 1404 includes a first portion wall 1404*a* and a second portion wall 1404*b*. The first portion wall 1404*a* is a portion wall surrounding the circular opening 412*o*. Through the circular opening 412*o*, the columnar space 412 is coupled to the second region 4C22. The columnar space 412 is located further on the air release port 401 side than is the second region 4C22 in the air introducing path 400. The second portion wall 1404*b* is a portion wall surrounding the circular opening 413*o*. Through the circular opening 413*o*, the columnar space 413 is coupled to the second region 4C22. The columnar space 413 is located further on the liquid containing chambers 117 and 121 side than is the second region 4C22 in the air introducing path 400.

In the second region 4C22, the size of the space surrounded by the second portion wall 1404*b* is greater than the size of the space surrounded by the first portion wall 1404*a*. Note that the "size of the space surrounded by the first portion wall 1404*a*" is defined by the diameter of the largest virtual circle that can be accommodated in the region surrounded by the first portion wall 1404*a* when viewed in a direction perpendicular to the opening surface of the circular opening 412*o*. The "size of the space surrounded by the second portion wall 1404*b*" is defined by the diameter of the largest virtual circle that can be accommodated in the region surrounded by the second portion wall 1404*b* when viewed in a direction perpendicular to the opening surface of the circular opening 413*o*.

With such a configuration, the ink is easily collected in the space surrounded by the second portion wall 1404*b* located closer to the liquid containing chambers 117 and 121 than the space surrounded by the first portion wall 1404*a* in the second region 4C22. In other words, a larger amount of ink can be captured in the space surrounded by the second portion wall 1404*b*. Therefore, compared to a configuration in which the space surrounded by the second portion wall 1404*b* is smaller than the space surrounded by the first portion wall 1404*a*, the ink is easily guided to the second region 4C2. In other words, the ink is less likely to reach the air release port 401.

The partition wall film FLp is bonded to an upper end of the surrounding wall 1404. The partition wall film FLp separates the space surrounded by the surrounding wall 1404 from the outside of the liquid container IC1 (see the lower left portion of FIG. 2).

The third region 4C3 is provided on a side facing the inner film FLi in the housing 900 (see the lower left portion of FIG. 5). The third region 4C3 is a channel portion extending in a direction different from the first region 4C1 and the second region 4C2. More specifically, the third region 4C3 extends in a direction perpendicular to the direction in which the first regions 410, 411, 412, and 413 extend and a direction twisted from the direction in which the second regions 4C21 and 4C22 extend.

The third region 4C3 is coupled to the first region 411 through a circular opening having a circular external shape (see the lower left portion of FIG. 5). The third region 4C3 is coupled to the first region 412 through a circular opening having a circular external shape.

As a result, air introduced from the air release port 401 passes through the first region 410, the second region 4C21, the first region 411, the third region 4C3, the first region 412, the second region 4C22, and the first region 413 in order in the capturing portion 4C.

With such a configuration, even when the liquid container IC1 is disposed in various orientations, the ink can be captured by the first region 4C1, the second region 4C2, and the third region 4C3 included in the capturing portion 4C constituting a part of the air introducing path 400 and extending in different directions from each other. As a result, the possibility that the ink in the liquid containing chambers 117 and 121 flows out to the outside through the air release port 401 can be reduced.

The housing 900 includes another wall portion 1406 projecting from the wall portion 1402 in the same direction as the surrounding wall 1404 and adjacent to the surrounding wall 1404. Note that two wall portions "being adjacent" means that between the two walls, another wall projecting in the same direction as the two walls does not exist. The height of the surrounding wall 1404 is greater than the height of the wall portion 1406. Note that the height of the surrounding wall 1404 is a dimension measured in the projecting direction from the wall portion 1402.

Figure 8:
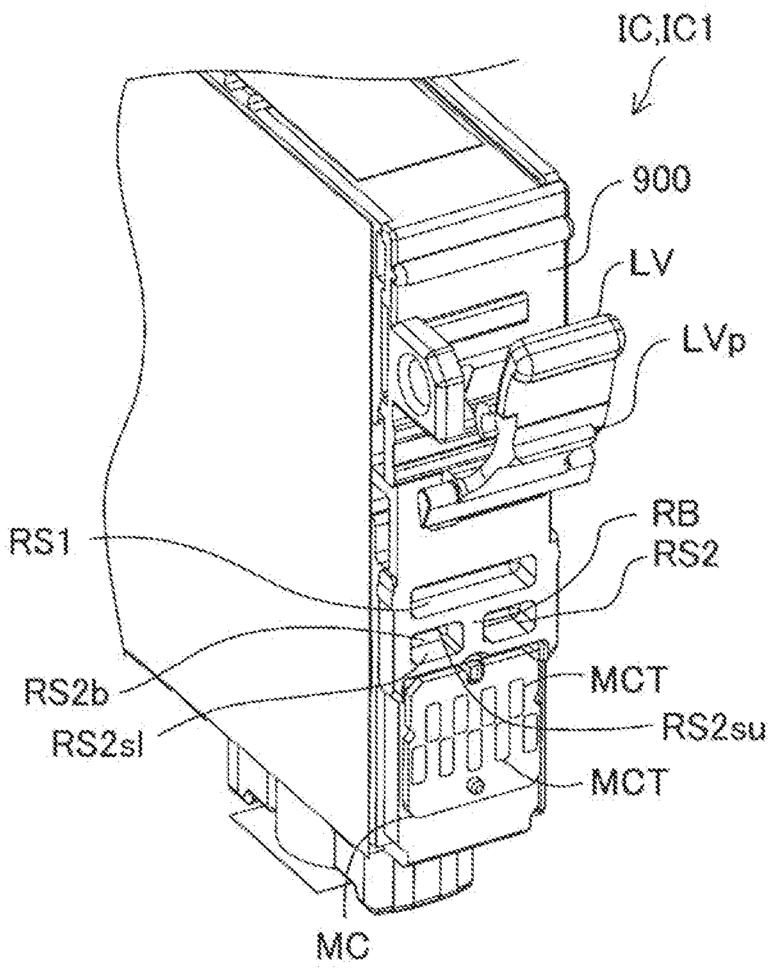
FIG. 8 is a perspective view illustrating a configuration of a side surface, of side surfaces of the liquid container, on which a memory chip is provided.
Figure 9:
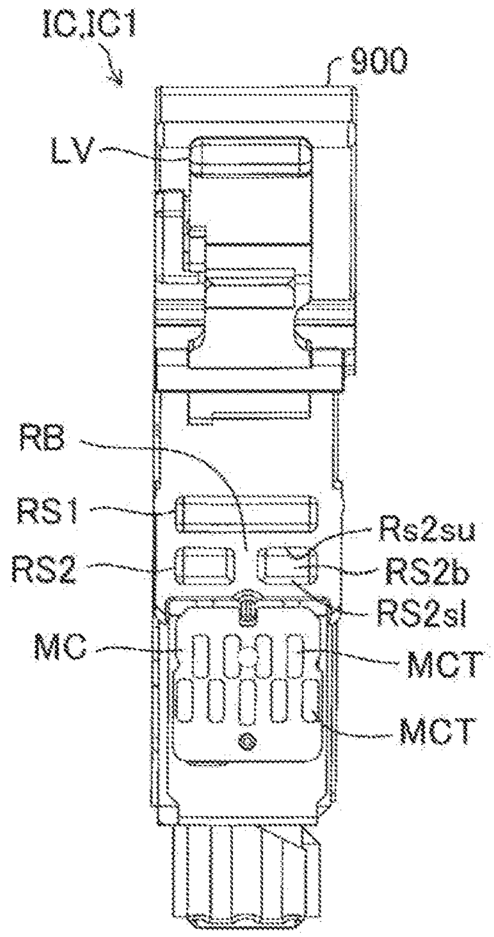
FIG. 9 is a side view illustrating the side surface, of the side surfaces of the liquid container, on which the memory chip is provided.

FIG. 8 is a perspective view illustrating a configuration of a side surface, of side surfaces of the liquid container IC1, on which the memory chip MC is provided. FIG. 9 is a side view illustrating the side surface, of the side surfaces of the liquid container IC1, on which the memory chip MC is provided. The liquid container IC1 includes a lever LV in a portion of an outer surface of the housing 900 located on the same side as the nine terminals MCT with respect to the liquid containing chambers 117 and 121. The lever LV is a bar-shaped member that is attached to the housing 900 so as to be rotatable through a rotation shaft LVs. The lever LV is rotatable with respect to the housing 900 around the rotation shaft LVs in a direction perpendicular to the longitudinal direction of the rotation shaft LVs. The lever LV is formed of an elastically deformable material.

The lever LV includes a projecting portion LVp on an opposite side of a side facing the housing 900. The projecting portion LVp meshes with a projecting portion PP provided in the printer PRT when the liquid container IC1 is mounted to the printer PRT, and elastically presses the projecting portion PP of the printer PRT. As a result, the liquid container IC1 is prevented from being detached from the printer PRT. Note that in the present specification, "meshing with" means a state in which a side surface of a recessed portion or projecting portion comes into contact with a side surface of another recessed portion or projecting portion, and a force is applied from one to the other.

The liquid container IC1 includes recessed portions RS1 and RS2 on an outer surface of the housing 900 and on the same side as the nine terminals MCT with respect to the liquid containing chambers 117 and 121 (see the lower right portion of FIG. 8 and the central portion of FIG. 9). The recessed portions RS1 and RS2 are provided between the lever LV and the nine terminals MCT. The recessed portions RS1 and RS2 each define a space having a substantially rectangular parallelepiped shape that is elongated in a direction coinciding with a horizontal direction in an orientation when the liquid container IC1 is mounted to the printer PRT and used. The recessed portions RS1 and RS2 have the same widths in the direction coinciding with the horizontal direction in the orientation when the liquid container IC1 is mounted to the printer PRT and used. However, a rib RB described later is provided in a central portion of the recessed portion RS2.

The recessed portion RS2 includes a bottom surface RS2*b* and side surfaces RS2*su* and RS2*sl* (see the lower section of FIG. 8 and the central portion of FIG. 9). The side surfaces RS2*su* and RS2*sl* face each other across the bottom surface RS2*b*. The side surface RS2*su* is a side surface located on the lever LV side with respect to the bottom surface RS2*b*. The side surface RS2*sl* is a side surface located on the terminal MCT side with respect to the bottom surface RS2*b*.

The liquid container IC1 includes the rib RB projecting from an outer surface of the housing 900. More specifically, the rib RB projects from the bottom surface RS2*b* constituting a part of the outer surface of the housing 900 in the recessed portion RS2. Note that second type liquid container IC2 described later does not include the rib RB described above in the recessed portions RS1 and RS2. The rib RB has a flat-plate shape coupled to the side surfaces RS2*su* and RS2*sl*, and the bottom surface RS2*b* of the recessed portion RS2. The rib RB does not project further outside than the opening of the recessed portion RS2. More specifically, an end surface of the rib RB is on the same plane as a virtual surface defining the opening of the recessed portion RS2 (see the lower right portion of FIG. 8).

In the first type liquid container IC1, the rib RB is provided in the recessed portion RS2 (see the lower right portion of FIG. 8). Therefore, the rib RB does not become an obstacle when the liquid container IC1 is attached to the printer PRT.

In the first type liquid container IC1, since the rib RB is provided in the recessed portion RS2, the possibility that the rib RB receives a force from outside and is lost is reduced. Therefore, the possibility that the first type liquid container IC1 is falsely identified as the second type liquid container IC2 due to the loss of the rib RB is reduced.

The first type liquid container IC1 includes the rib RB on an outer surface of the housing 900 and on the same side as the plurality of terminals MCT with respect to the liquid containing chambers 117 and 121 (see the lower right portion of FIG. 8). When the portion, on the outer surface of the housing 900, provided with the plurality of terminals MCT receives an external force and is deformed, among nine pairs of the respective nine terminals MCT of the liquid container IC1 and the respective nine terminals of the printer PRT, at least some pairs may not be able to come into contact. However, in the present embodiment, the possibility that the portion, on the outer surface of the housing 900, in which the plurality of terminals MCT is provided receives an external force and is deformed is reduced by the rib RB. Therefore, the plurality of terminals MCT of the liquid container IC1 can come into contact with terminals PT on the printer PRT side more reliably by the rib RB.

At the time of ink refilling, information on the ink in the liquid containing chamber 121 is collected through the terminals MCT of the first type liquid container IC1. In the present embodiment, the first type liquid container IC1 includes the rib RB on an outer surface of the housing 900 and on the same side as the plurality of terminals MCT with respect to the liquid containing chambers 117 and 121 (see the lower right portion of FIG. 8). That is, the rib RB configured to confirm the first type liquid container IC1 and the terminals MCT configured to collect information on the ink in the liquid containing chamber 121 at the time of ink refilling are provided on the same side. Therefore, the size of a device for performing the processing described above at the time of ink refilling can be reduced.

The first type liquid container IC1 includes the rib RB on an outer surface of the housing 900 and between the lever LV and the plurality of terminals MCT (see the lower right portion of FIG. 8). With such a configuration, even when the lever LV that presses the printer PRT receives a reaction force from the printer PRT, the possibility that the portion provided with the nine terminals MCT is deformed can be reduced by the rib RB. Therefore, even when the lever LV receives a reaction force from the printer PRT, the nine terminals MCT of the liquid container IC1 can more reliably come into contact with the terminals on the printer PRT side.

In the first type liquid container IC1, the rib RB is provided such that the thickness thereof is substantially the same as the thickness of the configuration that separates the recessed portion RS1 and the recessed portion RS2. In the present specification, two numerical values "being substantially the same" means that the difference between the two numerical values is less than 10% of the larger numerical value of the two numerical values.

With such a configuration, compared to a configuration in which the thicknesses of both of the rib RB and the configuration that separates the recessed portion RS1 and the recessed portion RS2 are greatly different from each other, the following effect can be obtained. That is, when the housing 900 is formed by casting, the risk of deformation of the housing 900 due to shrinkage of a resin as a material caused by cooling can be reduced.

Figure 10:
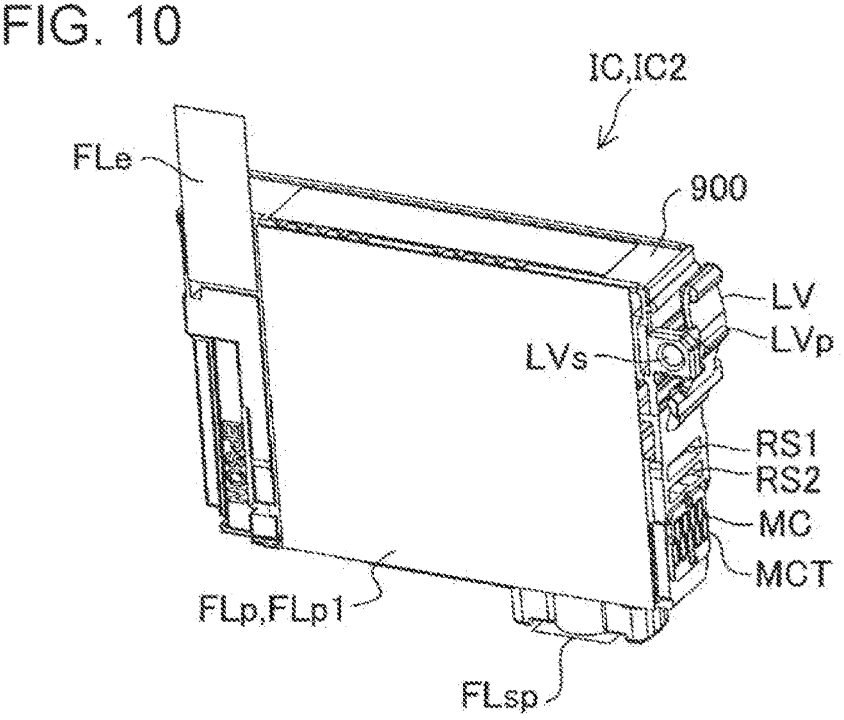
FIG. 10 is a perspective view illustrating a liquid container of the present embodiment.

FIG. 10 is a perspective view illustrating the liquid container IC2 of the present embodiment. FIG. 10 illustrates the second type liquid container IC2 of the liquid containers IC1 and IC2. The second type liquid container IC2 is not refilled with ink after the liquid container IC2 is used. In the following description, only the differences of the configuration of the liquid container IC2 from that of the liquid container IC1 will be described. Except for the differences to be described below, the configuration of the liquid container IC2 is the same as the configuration of the liquid container IC1. For example, the second type liquid container IC2 includes the recessed portions RS1 and RS2 in the same portions as the recessed portions RS1 and RS2 of the first type liquid container IC1. The second type liquid container IC2 includes the nine terminals MCT in the same portions as the nine terminals MCT of the first type liquid container IC1. The second type liquid container IC2 includes the lever LV in the same portion as the lever LV of the first type liquid container IC1.

In the second type liquid container IC2, the partition wall film FLp is configured with the first partition wall film FLp1 (see the lower left portion of FIG. 10). Since ink refilling described later is not performed on the second type liquid container IC2, the second partition wall film FLp2 is not adhered onto the first partition wall film FLp1 (see the lower section of FIG. 1).

Figure 11:
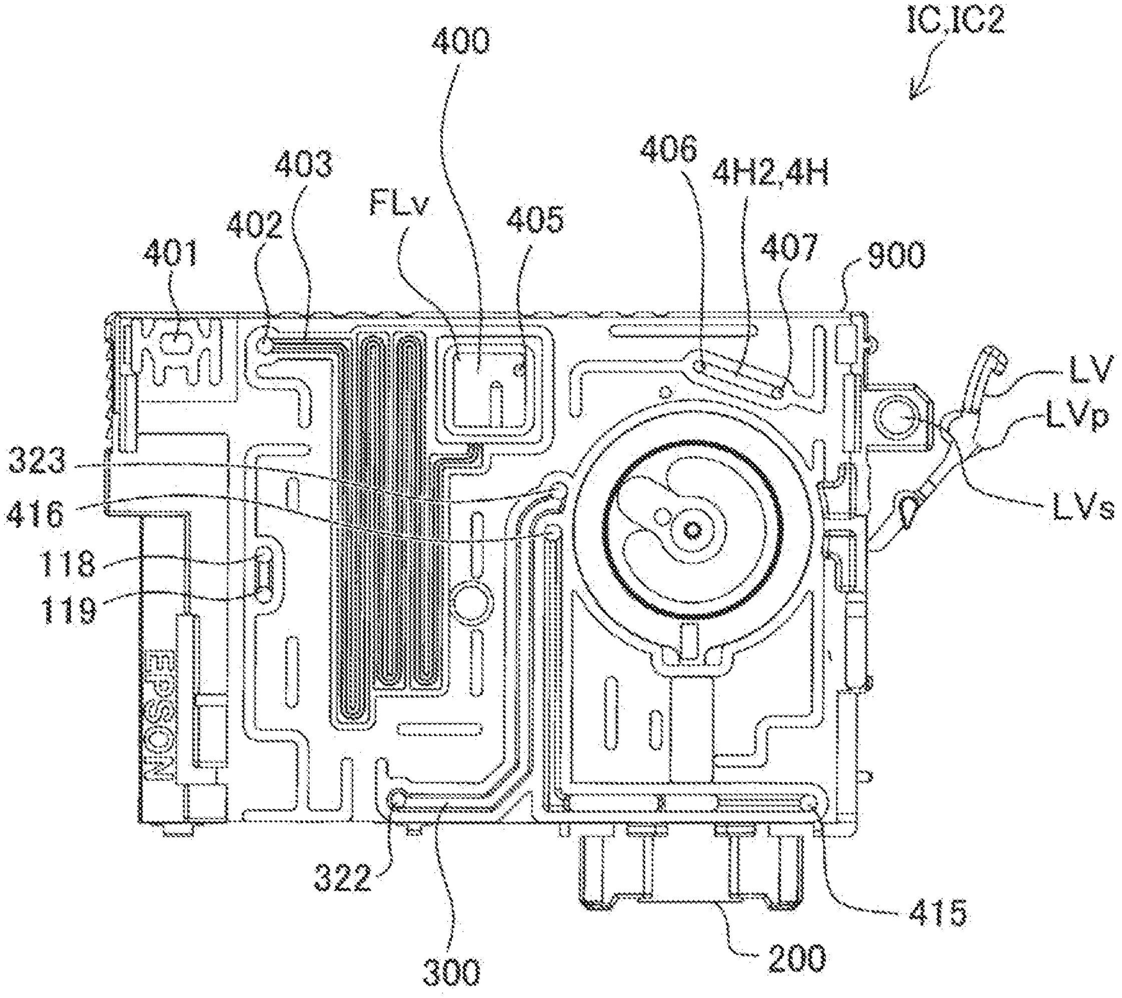
FIG. 11 is a side view of the liquid container.
Figure 12:
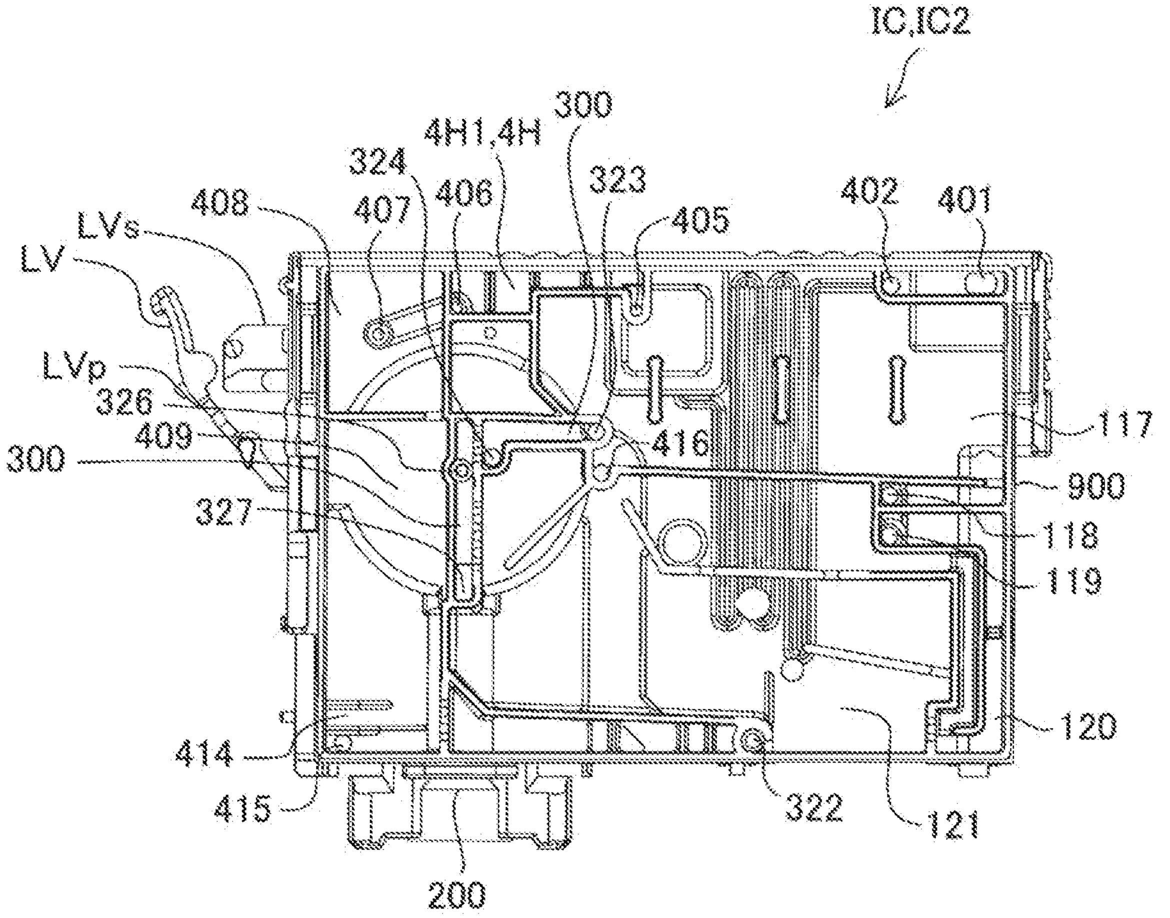
FIG. 12 is a side view of the liquid container viewed in an opposite direction of FIG. 11.

FIG. 11 is a side view of the liquid container IC2. FIG. 12 is a side view of the liquid container IC2 viewed in an opposite direction of FIG. 11. FIG. 11 corresponds to FIG. 3 illustrating the liquid container IC1. FIG. 12 corresponds to FIG. 5 illustrating the liquid container IC1.

In the liquid container IC2, the air introducing path 400 does not include the capturing portion 4C (see the lower right portions of FIGS. 3 and 11, and the lower left portions of FIGS. 5 and 12). That is, in the liquid container IC2, the air introducing path 400 includes the bent channel portion 403, the barrier channel portion 4H, the air chambers 408 and 409, and the air chamber 414 in order from the air release port 401 toward the liquid containing chamber 117.

Figure 13:
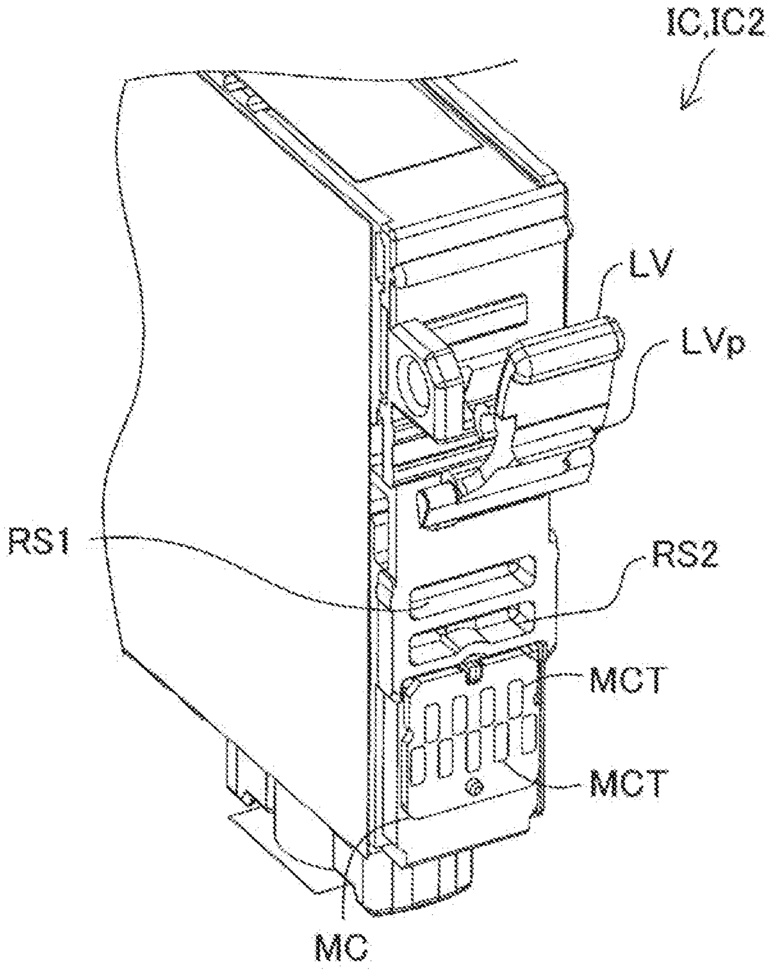
FIG. 13 is a perspective view illustrating a configuration of a side surface, of side surfaces of the liquid container, on which the memory chip is provided.

FIG. 13 is a perspective view illustrating a configuration of a side surface, of side surfaces of the liquid container IC2, provided with the memory chip MC. FIG. 13 corresponds to FIG. 8 illustrating the liquid container IC1. The second type liquid container IC2 of the liquid containers IC1 and IC2 does not include the rib RB (see the lower central portion of FIG. 13 and the lower central portion of FIG. 8).

Figure 14:
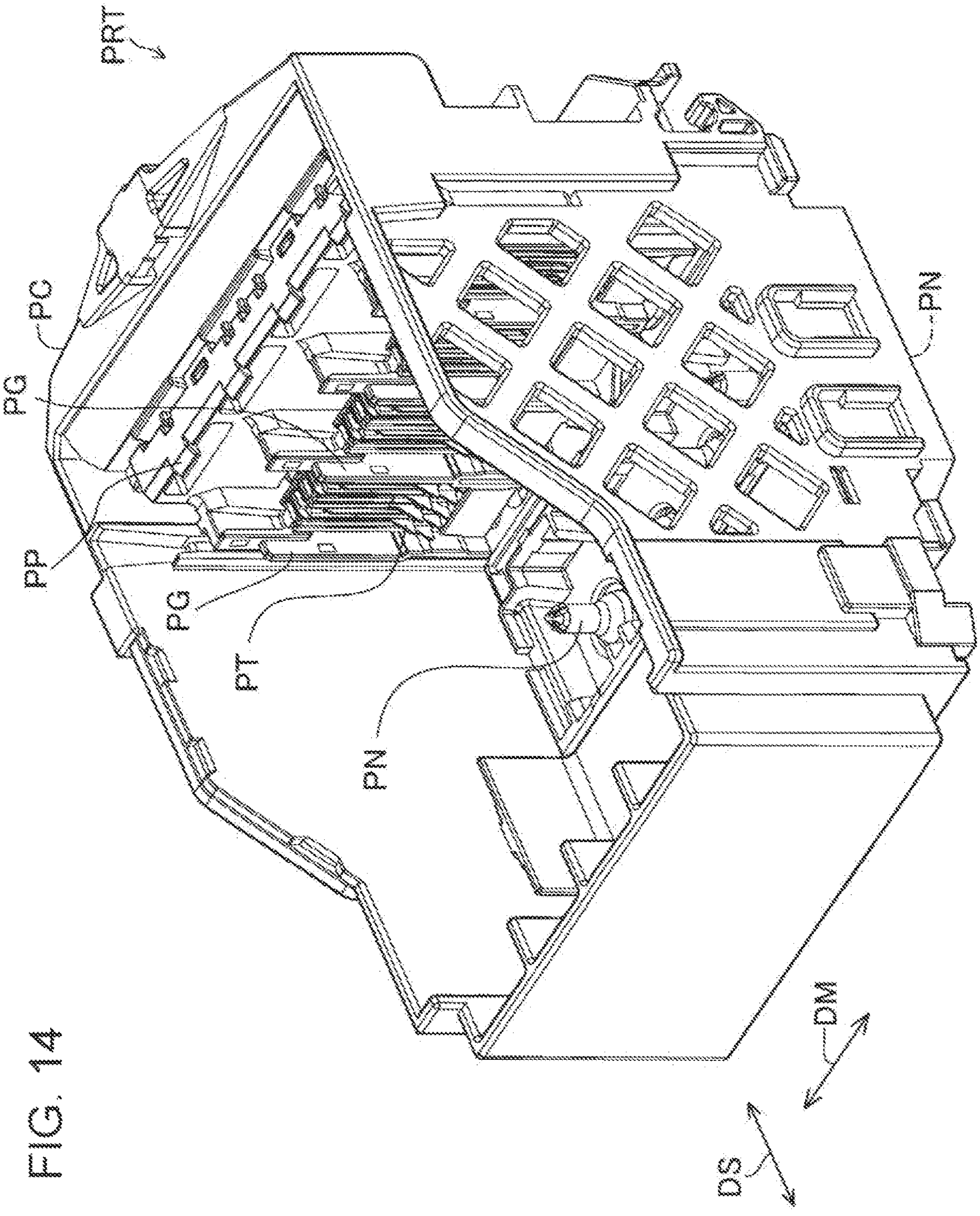
FIG. 14 is a perspective view illustrating a carriage included in a printer.

FIG. 14 is a perspective view illustrating a carriage PC included in the printer PRT. Four liquid containers IC can be attached to the carriage PC, and the carriage PC discharges ink contained in the respective liquid containers IC as ink droplets from four sets of nozzle groups PN provided on a lower surface. The printer PRT drives a main scanning driving mechanism so as to reciprocate the carriage PC along a main scanning direction DM, which is a direction in which the four sets of nozzle groups PN are arranged. The printer PRT drives a sub-scanning driving mechanism so as to transport a printing medium disposed at a position facing the carriage PC in a sub-scanning direction DS. The sub-scanning direction DS is a direction perpendicular to the main scanning direction DM. As a result, an image is formed on the printing medium by the ink droplets. Both of the liquid containers IC1 and IC2 can be attached to the carriage PC.

The carriage PC has a box shape having a substantially rectangular bottom portion, and a side wall substantially perpendicularly coupled to each side of the bottom portion. The carriage PC includes four sets of a liquid supply needle PN, a set of terminals PT, a projecting portion PP, and the nozzle group PN. One set of the liquid supply needle PN, the terminals PT, the projecting portion PP, and the nozzle group PN corresponds to one liquid container IC attached to the printer PRT. That is, the liquid supply needle PN, the terminals PT, and the projecting portion PP included in one set come into contact with one liquid container IC attached to the printer PRT. The nozzle group PN included in the set discharges the ink supplied from the liquid container IC.

Figure 15:
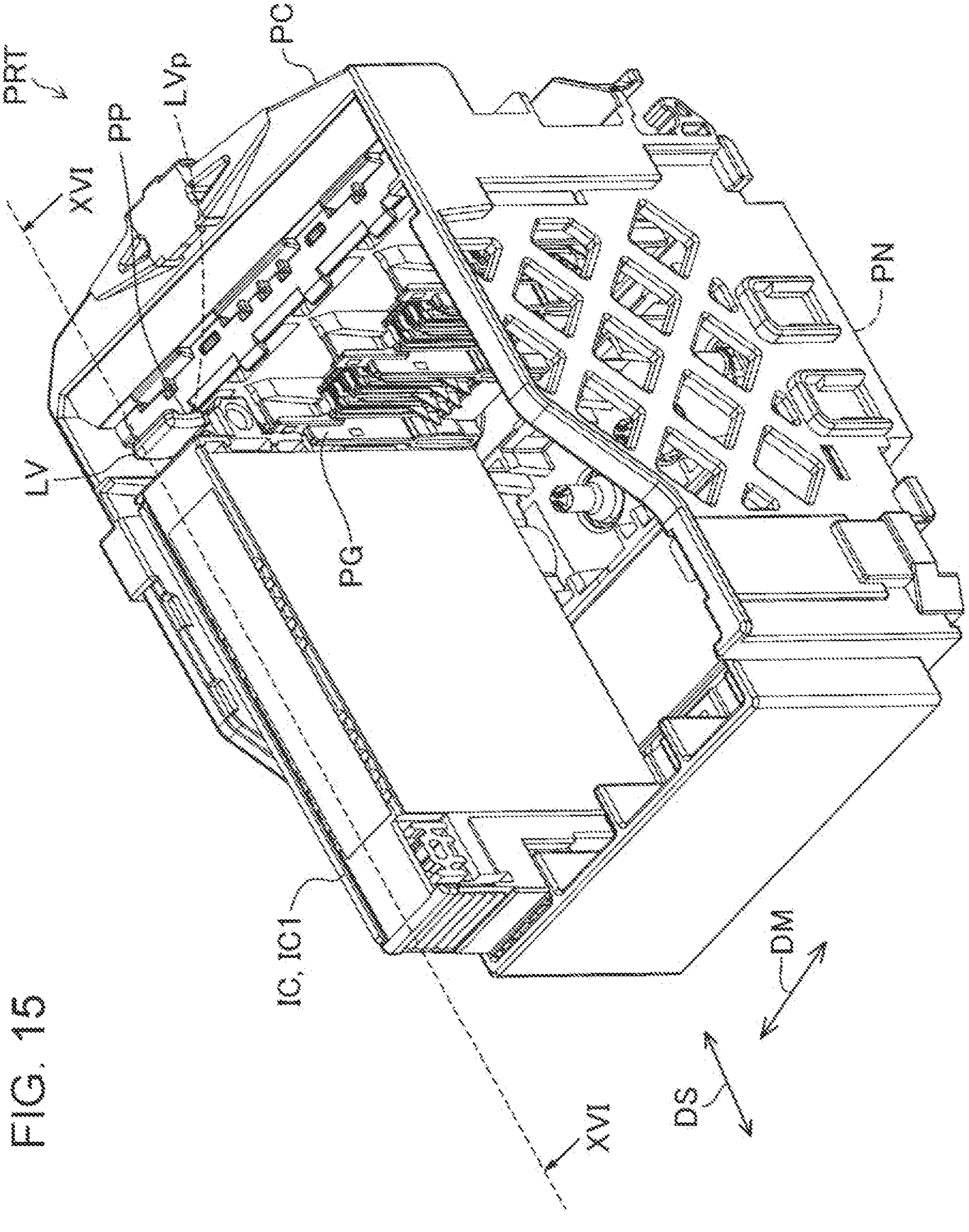
FIG. 15 is a perspective view illustrating a state in which one liquid container is attached to the carriage.

FIG. 15 is a perspective view illustrating a state in which one liquid container IC is attached to the carriage PC. The liquid supply needle PN is provided in the bottom portion of the carriage PC (see the central portion of FIG. 14). The liquid supply needle PN is inserted into the liquid container IC from the liquid supply port 200 of the liquid container IC attached to the carriage PC (see the lower right portion of FIG. 6). As a result, the liquid supply needle PN is coupled to the liquid supply path 300 in the liquid container IC. The ink received by the liquid supply needle PN from the liquid container IC is discharged as ink droplets from one set of nozzles provided in the bottom portion of the carriage PC.

Figure 16:
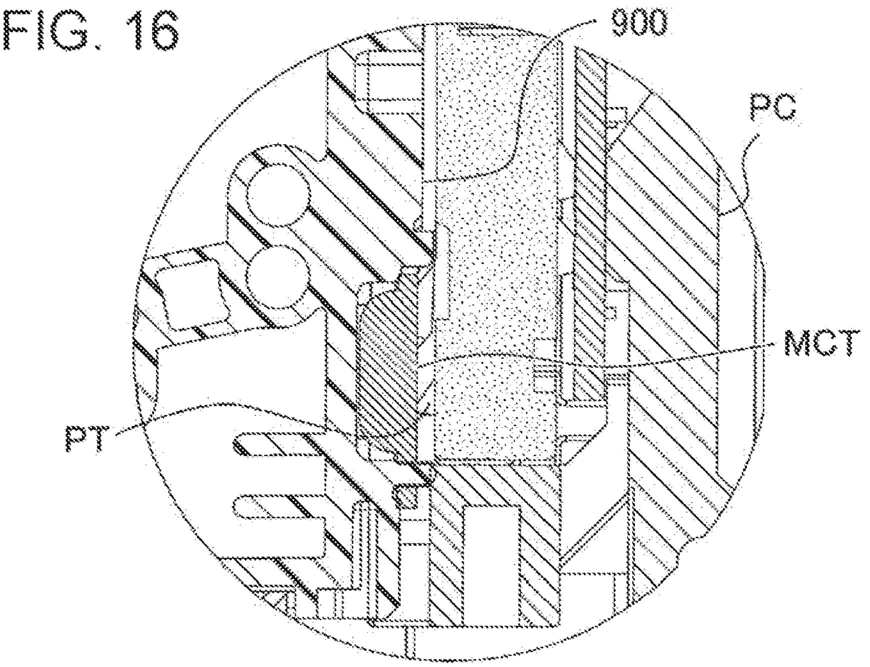
FIG. 16 is a sectional view illustrating a state near a terminal of a liquid container attached to the carriage.

FIG. 16 is a sectional view illustrating a state near the terminal MCT of the liquid container IC1 attached to the carriage PC. FIG. 16 is a sectional view taken along XVI-XVI of FIG. 15. One set of terminals PT is provided in one of the side walls parallel to the main scanning direction DM (see the upper right portion of FIG. 14). One set of terminals PT is configured with nine terminals. The nine terminals PT are electrically coupled to a control circuit of the printer PRT. The nine terminals PT is electrically coupled to the nine terminals MCT of the liquid container IC attached to the carriage PC (see the central portion of FIG. 16).

On each end of one set of terminal PT is provided with a guide PG. One guide PG is provided between adjacent two sets of terminals PT. When the liquid container IC is attached to the carriage PC, each of two facing side surfaces coupled to the side surface, of the housing 900, to which the memory chip MC is attached comes into contact the guide PG, whereby the orientation of the liquid container IC is regulated. More specifically, in the housing 900, the configuration that defines each end of the recessed portions RS1 and RS2 comes into contact with the guide PG, whereby the orientation of the liquid container IC is regulated (see the upper right portion of FIG. 15).

The projecting portion PP is provided on the same side wall as the side wall provided with one set of terminals PT (see the upper central portion of FIG. 14). The projecting portion PP meshes with the projecting portion LVp of the lever LV of the liquid container IC attached to the carriage PC (see the upper central portion of FIG. 15). The projecting portion PP is pressed against the projecting portion LVp of the lever LV by an elastic force of the lever LV that is elastically deformed. As a result, the liquid container IC is prevented from being detached from the printer PRT.

A2. Effects of Liquid Container

In the present embodiment, the first type liquid container IC1 of the liquid containers IC1 and IC2 includes the rib RB projecting from an outer surface of the housing 900 (see the lower central portion of FIG. 8). On the other hand, the second type liquid container IC2 does not include the rib RB (see the lower central portion of FIG. 13).

With such a configuration, based on the existence of the specific rib RB provided on the outer surface of the housing 900, the first type liquid container IC1 can be distinguished from the second type liquid container IC2. Therefore, compared to a plurality of liquid containers that is distinguished based on holes formed at the time of ink refilling in the past or text and images printed on the housing, the first type liquid container IC1 and the second type liquid container IC2 can be easily and reliably distinguished. Therefore, whether or not a liquid container, among the plurality of liquid containers that is collected after used in which the first type liquid container IC1 and the second type liquid container IC2 are mixed, is the liquid container IC1 to be refilled with ink can be easily and reliably identified before ink refilling. As a result, a phenomenon in which the liquid container IC2 not to be refilled with ink is refilled with ink, the liquid container IC2 is used, and low-quality printing is performed can be avoided.

In addition, in a liquid container that is distinguished based on the existence of a recessed portion provided on an outer surface of the housing 900, when a foreign substance enters the recessed portion and is retained in the recessed portion, the recessed portion may not be detected. However, in the present embodiment, the first type liquid container IC1 and the second type liquid container IC2 are distinguished based on the existence of the rib RB provided on an outer surface of the housing 900 and having a substantial configuration. Therefore, the possibility that the first type liquid container IC1 is falsely identified as the second type liquid container IC2 is reduced.

Moreover, by providing the rib RB as a configuration for distinguishing the first type liquid container IC1 and the second type liquid container IC2, the rigidity of the housing 900 in the first type liquid container IC1 can be increased.

The printer PRT of the present embodiment is also called a "liquid consuming apparatus". The ink is also called a "liquid".

B. Modification of First Type Liquid Container

In the first type liquid container IC1 of the above-described embodiment, the rib RB is provided in the recessed portions RS2 (see the lower right portion of FIG. 8 and the central portion of FIG. 9). The rib RB is perpendicularly coupled with respect to the side surfaces RS2*su* and RS2*sl*, and the bottom surface RS2*b* of the recessed portion RS2. In addition, in the recessed portion RS1, no rib is provided. However, the rib provided in the first type liquid container is not limited to such a configuration, and can have the following configuration.

Except for the differences described below, the configurations of liquid containers IC1*b* to IC1*m* are the same as that of the liquid container IC1. When a recessed portion included in the liquid containers IC1*b* to IC1*f* has the same configuration as the recessed portion RS1 of the liquid container IC1 except for a rib, the recessed portion is referred to as the "recessed portion RS1". When a recessed portion included in the liquid containers IC1*b* to IC1*f* has the same configuration as the recessed portion RS2 of the liquid container IC1 except for a rib, the recessed portion is referred to as the "recessed portion RS2". Note that each rib of the modifications indicated below perpendicularly projects from the bottom surface of a recessed portion, which is an outer surface of the housing.

Figure 17:
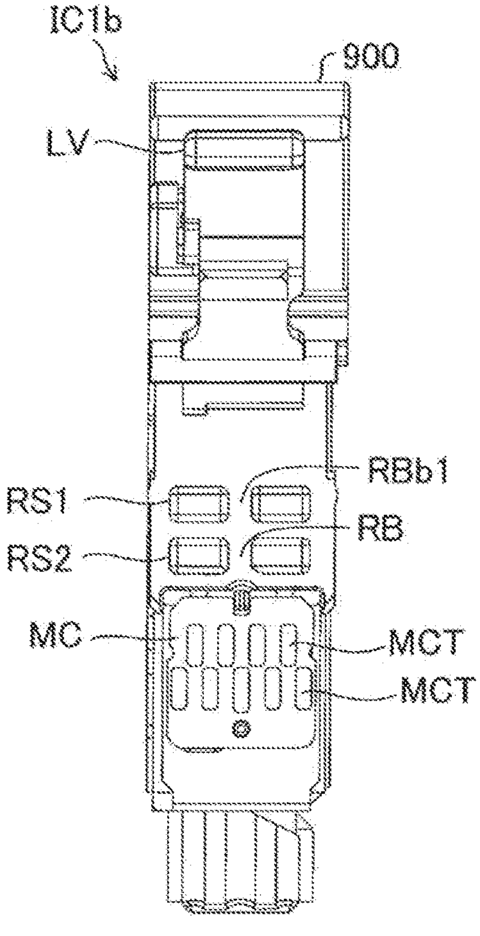
FIG. 17 is a side view illustrating a side surface, of side surfaces of a liquid container, to which the memory chip is provided.

1. FIG. 17 is a side view illustrating a side surface, of side surfaces of the liquid container IC1*b*, on which the memory chip MC is provided. In the first type liquid container IC1*b* as a modification illustrated in FIG. 17, in addition to the rib RB in the recessed portion RS2, a rib RBb1 is provided in the recessed portion RS1. The rib RBb1 in the recessed portion RS1 includes the same configuration as the rib RB in the recessed portion RS2.

On the other hand, the second type liquid container in this modification has the same configuration as the liquid container IC2 (see FIG. 13). That is, the second type liquid container does not include the ribs RB and RBb1 in the recessed portions RS1 and RS2. Even with such a configuration, based on the existence of the ribs RB and RBb1 provided on the outer surface of the housing 900, the first type liquid container IC1*b* can be distinguished from the second type liquid container IC2 (see the central portion of FIG. 17 and the lower right portion of FIG. 13).

Figure 18:
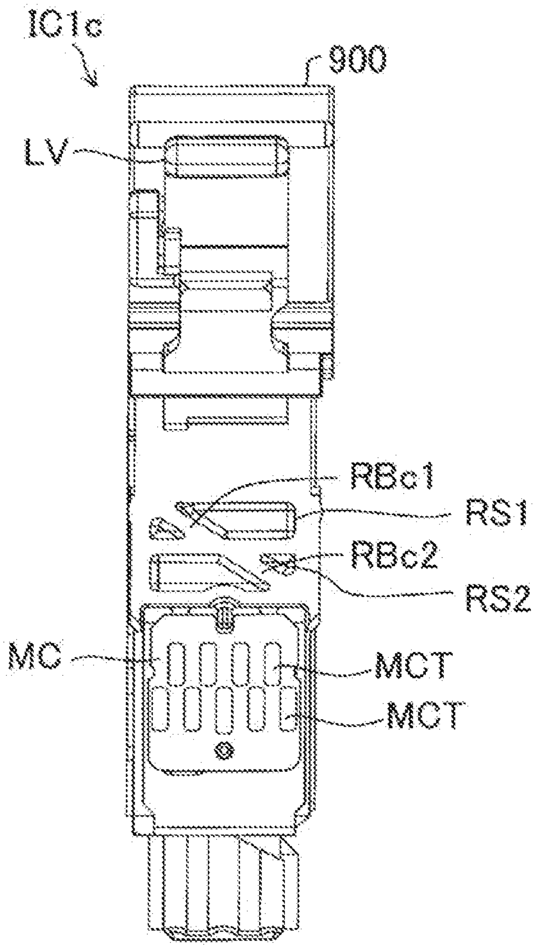
FIG. 18 is a side view illustrating a side surface, of side surfaces of a liquid container, to which the memory chip is provided.

2. FIG. 18 is a side view illustrating a side surface, of side surfaces of the liquid container IC1*c*, on which the memory chip MC is provided. In the first type liquid container IC1*c* as a modification illustrated in FIG. 18, a rib RBc1 provided in the recessed portion RS1 is coupled diagonally with respect to a side surface of the recessed portion RS1. A rib RBc2 provided in the recessed portion RS2 is coupled diagonally with respect to a side surface of the recessed portion RS2. In addition, the rib RBc1 in the recessed portion RS1 and the rib RBc2 of the recessed portion RS2 are linearly arranged.

On the other hand, the second type liquid container in this modification has the same configuration as the liquid container IC2 (see FIG. 13). That is, the second type liquid container does not include the ribs RBc1 and RBc2 in the recessed portions RS1 and RS2. Even with such a configuration, based on the existence of the ribs RBc1 and RBc2 provided on the outer surface of the housing 900, the first type liquid container IC1*c* can be distinguished from the second type liquid container IC2 (see the central portion of FIG. 18 and the lower right portion of FIG. 13).

Figure 19:
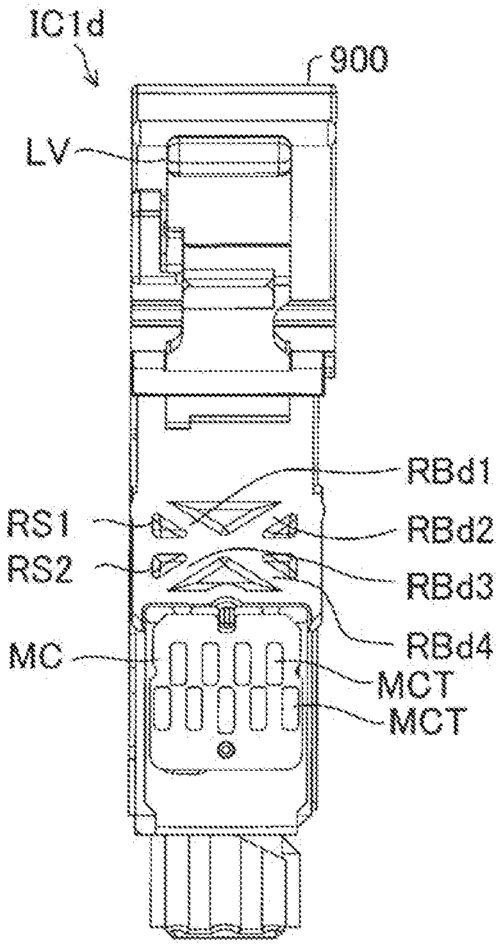
FIG. 19 is a side view illustrating a side surface, of side surfaces of a liquid container, to which the memory chip is provided.

3. FIG. 19 is a side view illustrating a side surface, of side surfaces of the liquid container IC1*d*, on which the memory chip MC is provided. In the first type liquid container IC1*d* as a modification illustrated in FIG. 19, ribs RBd1 and RBd2 provided in the recessed portion RS1 are inclined in opposite directions to each other and coupled diagonally with respect to a side surface of the recessed portion RS1. Ribs RBd3 and RBd4 provided in the recessed portion RS2 are inclined in opposite directions to each other and coupled diagonally with respect to a side surface of the recessed portion RS2. In addition, the rib RBd1 in the recessed portion RS1 and the rib RBd4 in the recessed portion RS2 are linearly arranged. The rib RBd2 in the recessed portion RS1 and the rib RBd3 in the recessed portion RS2 are linearly arranged.

On the other hand, the second type liquid container in this modification has the same configuration as the liquid container IC2 (see FIG. 13). That is, the second type liquid container does not include the ribs RBd1 to RBd4 in the recessed portions RS1 and RS2. Even with such a configuration, based on the existence of the ribs RBd1, RBd2, RBd3, and RBd4 provided on the outer surface of the housing 900, the first type liquid container IC1*d* can be distinguished from the second type liquid container IC2 (see the central portion of FIG. 19 and the lower right portion of FIG. 13).

Figure 20:
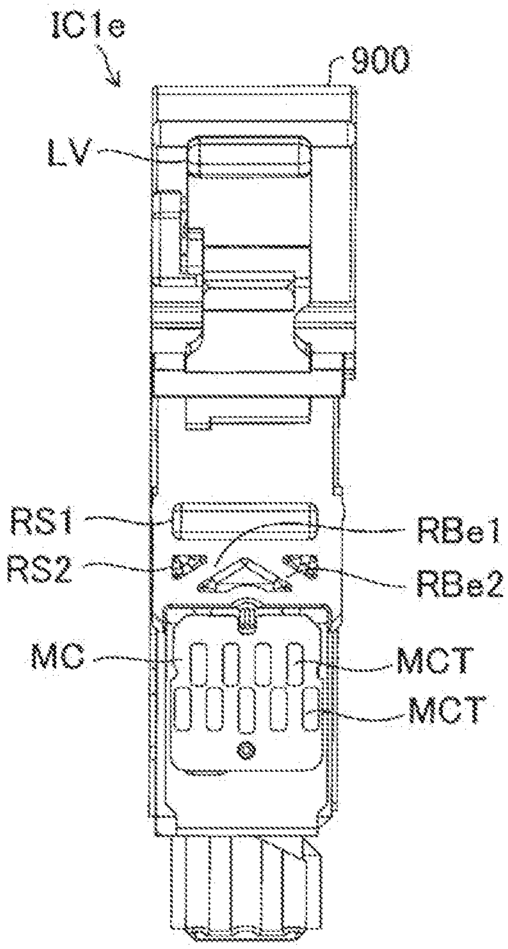
FIG. 20 is a side view illustrating a side surface, of side surfaces of a liquid container, to which the memory chip is provided.

4. FIG. 20 is a side view illustrating a side surface, of side surfaces of the liquid container IC1*e*, on which the memory chip MC is provided. In the first type liquid container IC1*e* as a modification illustrated in FIG. 20, ribs RBe1 and RBe2 in the recessed portion RS2 are inclined in opposite directions to each other and coupled diagonally with respect to a side surface of the recessed portion RS2. In addition, no rib is provided in the recessed portion RS1.

On the other hand, the second type liquid container in this modification has the same configuration as the liquid container IC2 (see FIG. 13). That is, the second type liquid container does not include the ribs RBe1 and RBe2 in the recessed portion RS2. Even with such a configuration, based on the existence of the ribs RBe1 and RBe2 provided on the outer surface of the housing 900, the first type liquid container IC1*e* can be distinguished from the second type liquid container IC2 (see the central portion of FIG. 20 and the lower right portion of FIG. 13).

Figure 21:
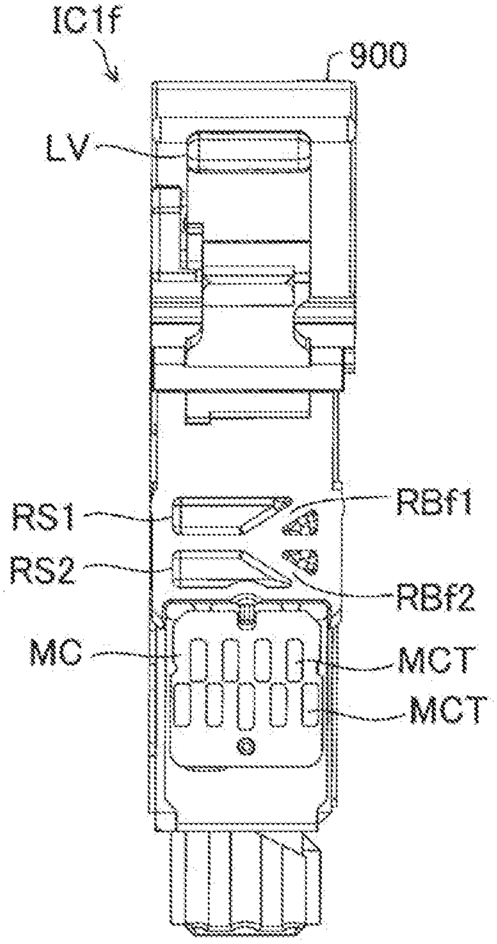
FIG. 21 is a side view illustrating a side surface, of side surfaces of a liquid container, to which the memory chip is provided.

5. FIG. 21 is a side view illustrating a side surface, of side surfaces of the liquid container IC1*f*, on which the memory chip MC is provided. In the first type liquid container IC1*f* as a modification illustrated in FIG. 21, a rib RBf1 in the recessed portion RS1 is coupled diagonally with respect to a side surface of the recessed portion RS1. A rib RBf2 in the recessed portion RS2 is coupled diagonally with respect to a side surface of the recessed portion RS2. In addition, the rib RBf1 in the recessed portion RS1 and the rib RBf2 in the recessed portion RS2 are disposed so as to be inclined in opposite directions to each other.

On the other hand, the second type liquid container in this modification has the same configuration as the liquid container IC2 (see FIG. 13). That is, the second type liquid container does not include the ribs RBf1 and RBf2 in the recessed portions RS1 and RS2. Even with such a configuration, based on the existence of the ribs RBf1 and RBf2 provided on the outer surface of the housing 900, the first type liquid container IC1*f* can be distinguished from the second type liquid container IC2 (see the central portion of FIG. 21 and the lower right portion of FIG. 13).

Figure 22:
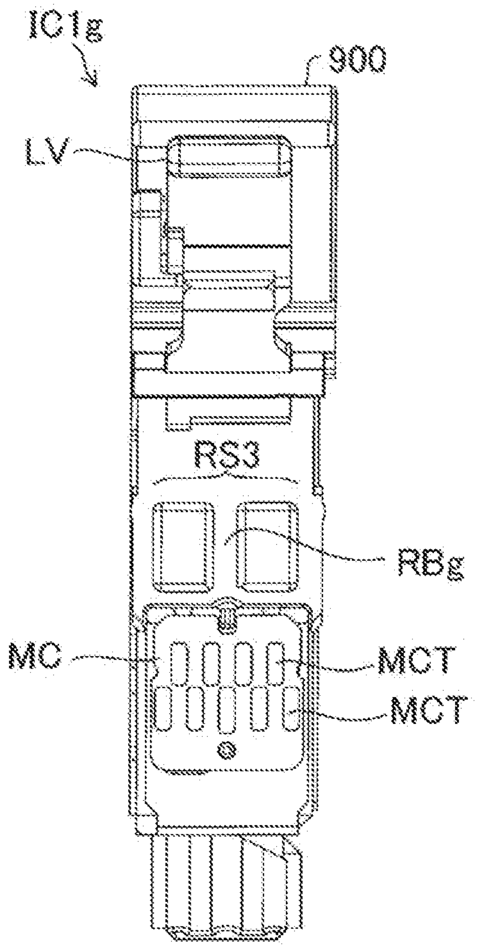
FIG. 22 is a side view illustrating a side surface, of side surfaces of a liquid container, to which the memory chip is provided.

6. FIG. 22 is a side view illustrating a side surface, of side surfaces of the liquid container IC1*g*, on which the memory chip MC is provided. In the first type liquid container IC1*g* as a modification illustrated in FIG. 22, a recessed portion RS3 including an opening at a position and having a size so as to contain the openings of the recessed portions RS1 and RS2 of the liquid container IC1 is provided (see FIGS. 9 and 13). A rib RBg is perpendicularly coupled with respect to side surfaces facing in the up-down direction and the bottom surface of the recessed portion RS3.

On the other hand, the second type liquid container in this modification has the recessed portion RS3 (see RS3 of FIG. 22). The second type liquid container does not include the rib RBg in the recessed portion RS3. Even with such a configuration, based on the existence of the rib RBg provided on the outer surface of the housing 900, the first type liquid container IC1*g* can be distinguished from the second type liquid container.

Figure 23:
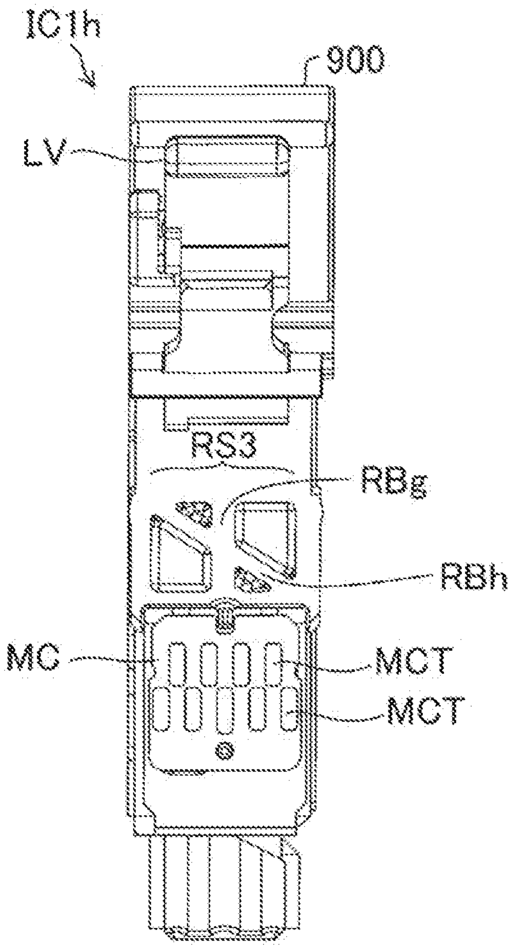
FIG. 23 is a side view illustrating a side surface, of side surfaces of a liquid container, to which the memory chip is provided.

7. FIG. 23 is a side view illustrating a side surface, of side surfaces of the liquid container IC1*h*, on which the memory chip MC is provided. In the first type liquid container IC1*h* as a modification illustrated in FIG. 23, the recessed portion RS3 including an opening similar to the liquid container IC1*g* illustrated in FIG. 22 is provided. Note that when the recessed portion included in the liquid containers IC1*h* to IC1*m* described below has the same configuration as the recessed portion RS3 of the liquid container IC1*g* except for the rib, the recessed portion is referred to as the "recessed portion RS3". In the liquid container IC1*h*, in addition to the rib RBg included in the liquid container IC1*g*, a rib RBh is provided in the recessed portion RS3. The rib RBh is coupled diagonally with respect to a side surface of the recessed portion RS3. The rib RBh intersects with the rib RBg.

On the other hand, the second type liquid container in this modification includes the recessed portion RS3 (see RS3 of FIG. 22). The second type liquid container does not include the ribs RBg and RBh in the recessed portion RS3. Even with such a configuration, based on the existence of the ribs RBg and RBh provided on the outer surface of the housing 900, the first type liquid container IC1*h* can be distinguished from the second type liquid container.

Figure 24:
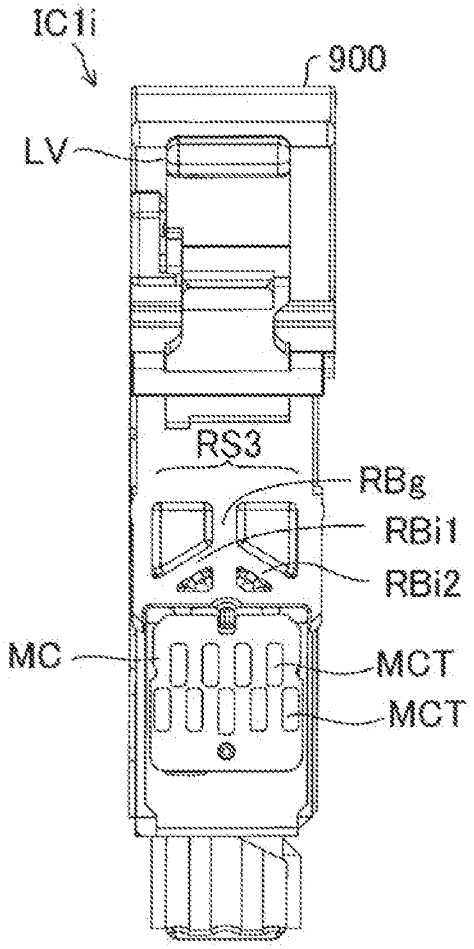
FIG. 24 is a side view illustrating a side surface, of side surfaces of a liquid container, to which the memory chip is provided.

8. FIG. 24 is a side view illustrating a side surface, of side surfaces of the liquid container IC1*i*, on which the memory chip MC is provided. In the first type liquid container IC1*i* as a modification illustrated in FIG. 24, the recessed portion RS3 including an opening similar to the liquid container IC1*g* illustrated in FIG. 22 is provided. However, in the liquid container IC1*i*, in addition to the rib RBg included in the liquid container IC1*g*, ribs RBi1 and RBi2 are provided in the recessed portion RS3. The ribs RBi1 and RBi2 are disposed on a side opposite to the rib RBg. The ribs RBi1 and RBi2 are inclined in opposite directions to each other and coupled diagonally with respect to the rib RBg and a side surface of the recessed portion RS3.

On the other hand, the second type liquid container in this modification has the recessed portion RS3 (see RS3 of FIG. 22). The second type liquid container does not include the ribs RBg, RBi1, and RBi2 in the recessed portion RS3. Even with such a configuration, based on the existence of the ribs RBg, RBi1, and RBi2 provided on the outer surface of the housing 900, the first type liquid container IC1*i* can be distinguished from the second type liquid container.

Figure 25:
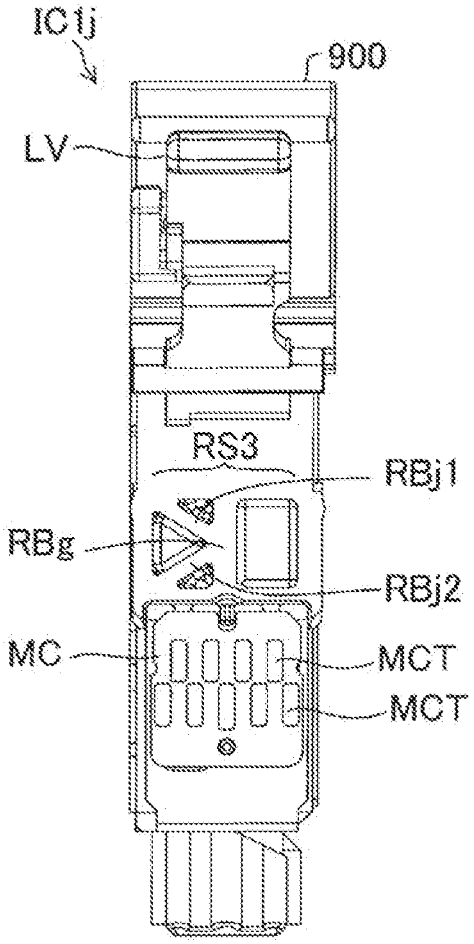
FIG. 25 is a side view illustrating a side surface, of side surfaces of a liquid container, to which the memory chip is provided.

9. FIG. 25 is a side view illustrating a side surface, of side surfaces of the liquid container IC1*j*, on which the memory chip MC is provided. In the first type liquid container IC1*j* as a modification illustrated in FIG. 25, the recessed portion RS3 including an opening similar to the liquid container IC1*g* illustrated in FIG. 22 is provided. However, in the liquid container IC1*j*, in addition to the rib RBg included in the liquid container IC1*g*, ribs RBj1 and RBj2 are provided in the recessed portion RS3. The ribs RBj1 and RBj2 are disposed on the same side as the rib RBg. The ribs RBj1 and RBj2 are inclined in opposite directions to each other and coupled diagonally with respect to the rib RBg and a side surface of the recessed portion RS3.

On the other hand, the second type liquid container in this modification has the recessed portion RS3 (see RS3 of FIG. 22). The second type liquid container does not include the ribs RBg, RBj1, and RBj2 in the recessed portion RS3. Even with such a configuration, based on the existence of the ribs RBg, RBj1, and RBj2 provided on the outer surface of the housing 900, the first type liquid container IC1*j* can be distinguished from the second type liquid container.

Figure 26:
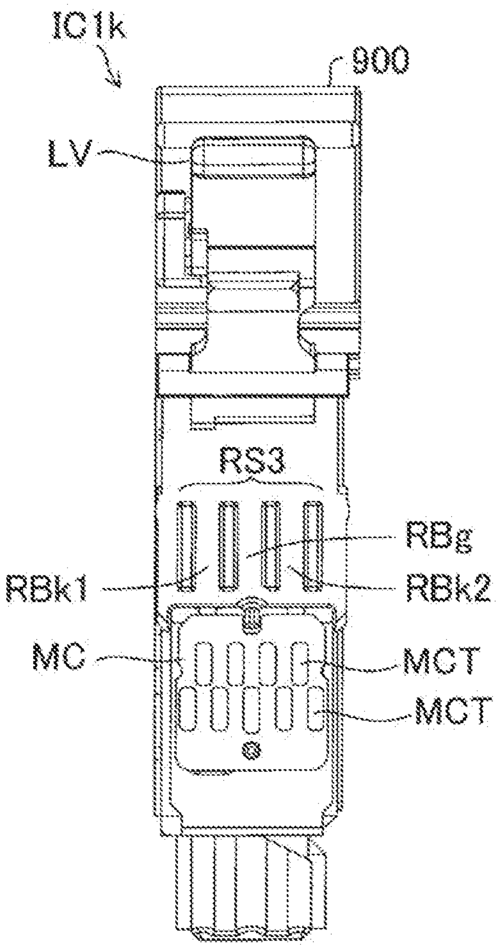
FIG. 26 is a side view illustrating a side surface, of side surfaces of a liquid container, to which the memory chip is provided.

10. FIG. 26 is a side view illustrating a side surface, of side surfaces of the liquid container IC1*k*, on which the memory chip MC is provided. In the first type liquid container IC1*k* as a modification illustrated in FIG. 26, the recessed portion RS3 including an opening similar to the liquid container IC1*g* illustrated in FIG. 22 is provided. However, in the liquid container IC1*k*, in addition to the rib RBg included in the liquid container IC1*g*, ribs RBk1 and RBk2 are provided in the recessed portion RS3. The ribs RBk1 and RBk2 are disposed in parallel to the rib RBg on sides opposite to each other with respect to the rib RBg.

On the other hand, the second type liquid container in this modification has the recessed portion RS3 (see RS3 of FIG. 22). The second type liquid container does not include the ribs RBg, RBk1, and RBk2 in the recessed portion RS3. Even with such a configuration, based on the existence of the ribs RBg, RBk1, and RBk2 provided on the outer surface of the housing 900, the first type liquid container IC1*k* can be distinguished from the second type liquid container.

Figure 27:
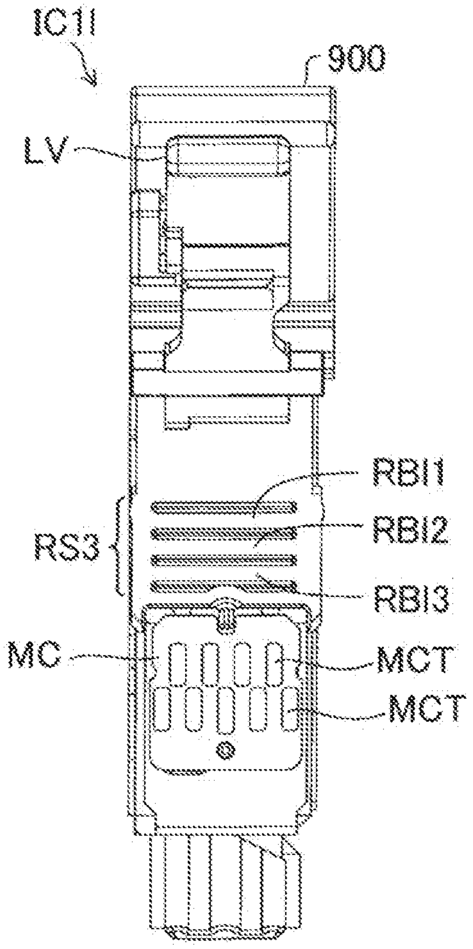
FIG. 27 is a side view illustrating a side surface, of side surfaces of a liquid container, to which the memory chip is provided.

11. FIG. 27 is a side view illustrating a side surface, of side surfaces of the liquid container IC1*l*, on which the memory chip MC is provided. In the first type liquid container IC1*l* as a modification illustrated in FIG. 27, the recessed portion RS3 including an opening similar to the liquid container IC1*g* illustrated in FIG. 22 is provided. However, in the liquid container IC1*l*, in place of the rib RBg included in the liquid container IC1*g*, three ribs RBl1, RBl2, and RBl3 extending in a direction perpendicular to the direction of the rib RBg are provided in the recessed portion RS3. The ribs RBl1, RBl2, and RBl3 are coupled perpendicularly with respect to side surfaces facing each other and the bottom surface of the recessed portion RS3.

On the other hand, the second type liquid container in this modification has the recessed portion RS3 (see RS3 of FIG. 22). The second type liquid container does not include the ribs RBl1, RBl2, and RBl3 in the recessed portion RS3. Even with such a configuration, based on the existence of the ribs RBl1, RBl2, and RBl3 provided on the outer surface of the housing 900, the first type liquid container IC1*l* can be distinguished from the second type liquid container.

Figure 28:
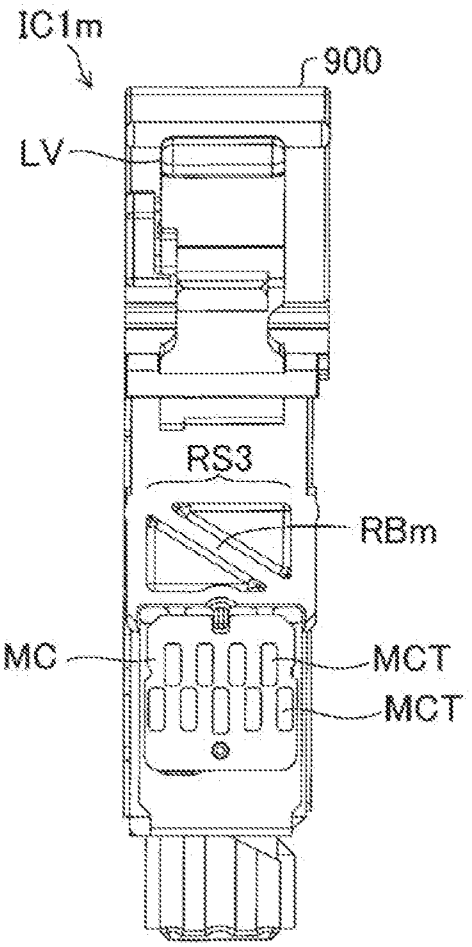
FIG. 28 is a side view illustrating a side surface, of side surfaces of a liquid container, to which the memory chip is provided.

12. FIG. 28 is a side view illustrating a side surface, of side surfaces of the liquid container IC1*m*, on which the memory chip MC is provided. In the first type liquid container IC1*m* as a modification illustrated in FIG. 28, the recessed portion RS3 including an opening similar to the liquid container IC1*g* illustrated in FIG. 22 is provided. However, in the liquid container IC1*m*, in place of the rib RBg included in the liquid container IC1*g*, a rib RBm is provided in the recessed portion RS3. The rib RBm is disposed diagonally in the recessed portion RS3 defining a substantially rectangular parallelepiped shape.

On the other hand, the second type liquid container in this modification has the recessed portion RS3 (see RS3 of FIG. 22). The second type liquid container does not include the rib RBm in the recessed portion RS3. Even with such a configuration, based on the existence of the rib RBm provided on the outer surface of the housing 900, the first type liquid container IC1*m* can be distinguished from the second type liquid container.

C. Other Embodiments

C1. Other Embodiment 1

1. In the above embodiments, a part of the liquid containing chambers 117 and 121 is defined by the housing 900, and another part is defined by the inner film FLi (see FIG. 5 and the upper right portion of FIG. 2). However, the housing may surround the entire liquid containing chamber and define the liquid containing chamber. In such a configuration, a hole is provided in the housing, and liquid refilling is performed through the hole.

2. In the above-described embodiment, a part of the housing 900 is exposed to the outside of the liquid container IC1 (see FIG. 1). However, the entire housing 900 may be exposed to the outside of the liquid container IC1. In such a configuration, a hole is provided in the housing, and liquid refilling is performed through the hole.

3. In the above-described embodiment, the liquid container IC1 includes the nine terminals MCT on the memory chip MC (see FIGS. 8 and 9). However, the number of terminals included in the liquid container is not limited to nine, and may be equal to or less than eight, such as one or two, or equal to or more than ten.

4. In the above-embodiment, the lever LV includes the projecting portion LVp on a side opposite to a side facing the housing 900 (see the middle right portions of FIGS. 8 and 13). However, the lever LV may include a recessed portion, in place of or in addition to the projecting portion. The lever LV may include a projecting portion or a recessed portion that meshes with a structure provided in the liquid consuming apparatus.

5. In the above-described embodiment, the projecting portion LVp of the lever LV elastically presses the projecting portion PP of the printer PRT when the liquid container IC1 is mounted to the printer PRT (see FIG. 15). However, the lever may press the structure of the printer with another portion such as a recessed portion or a plane portion provided in the lever.

6. In the above-described embodiment, the liquid container IC1 includes the rib RB in the recessed portion RS2 (see FIGS. 8 and 9). On the other hand, the second type liquid container IC2 does not include the rib RB described above in the recessed portion RS2 (see FIGS. 10 and 13). However, the first type liquid container and the second type liquid container may include another common rib in the same portion on an outer surface of the housing. That is, the first type liquid container may include a rib that is not included in the second type liquid container.

7. In the liquid container IC1 of the above-described embodiment, an end surface of the rib RB is on the same plane as a virtual plane defining the opening of the recessed portion RS2 (see FIG. 8). However, the end surface of the rib may be located further on the inner side of the recessed portion than is the surface defining the opening of the recessed portion. In the present specification, both configurations are included in "not projecting further to the outside than is the opening".

8. In the above-described embodiment, the liquid container IC contains ink. However, the liquid container in the liquid container may be the following liquid, for example.

1. Color materials to be used for manufacturing color filters for image display devices such as liquid crystal displays
2. Electrode materials to be used for forming electrodes of organic electroluminescence (EL) displays, field emission displays (FED), and the like
3. Liquid containing biological organic materials used for manufacturing biochips
4. Specimen as precision pipettes
5. Lubricating oil
6. Resin liquids 7. Transparent resin liquids such as ultraviolet curable resin liquids to form micro-hemispherical lenses used for optical communication elements or the like
8. Acidic or alkaline etchants for etching substrates or the like
9. Other appropriate liquids

C2. Other Embodiment 2

In the above-described embodiment, the liquid container IC1 includes the rib RB in the recessed portion RS2 provided on an outer surface of the housing 900 (see the lower section of FIG. 8). However, the first type liquid container may include a rib that projects from an outer surface of the housing on the outer surface of the housing and in a plane portion, which is not inside the recessed portion described above.

C3. Other Embodiment 3

In the above-described embodiment, the first type liquid container IC1 includes the rib RB on an outer surface of the housing 900 and on the same side as the plurality of terminals MCT with respect to the liquid containing chambers 117 and 121 (see FIGS. 5 and 8). However, the liquid container may have a rib in a portion of an outer surface of the housing located on the opposite side of the plurality of terminals with respect to the liquid containing chamber.

C4. Other Embodiment 4

1. In the above-described embodiment, the liquid container IC1 includes the lever LV in a portion of the outer surface of the housing 900 located on the same side as the nine terminals MCT with respect to the liquid containing chambers 117 and 121 (see FIGS. 5 and 8). However, the liquid container may have a lever in a portion of an outer surface of the housing located on the opposite side of the terminals with respect to the liquid containing chamber.

2. In the above-described embodiment, the recessed portions RS1 and RS2 are provided between the lever LV and the nine terminals MCT (see FIG. 8). However, the recessed portion may be provided on the opposite side of the lever with respect to the terminals.

D. Other Embodiments

The present disclosure is not limited to the above-described embodiments, and can be realized with various configurations within the scope of the present disclosure without departing from the gist of the present disclosure. For example, the present disclosure can be realized in the flowing embodiments. The technical features in the above-described embodiments corresponding to technical features in each embodiment described below can be appropriately exchanged or combined to resolve some or all of the problems of the present disclosure or achieve some or all of the advantages of the present disclosure. In addition, unless described as being essential in present specification, the technical features can be appropriately deleted.

1. According to an aspect of the present disclosure, a plurality of liquid containers configured to be attached to a same liquid consuming apparatus in an exchangeable manner is provided. The liquid containers each include a housing that surrounds at least a part of a liquid containing chamber containing a liquid in the liquid container and is exposed to an outside of the liquid container. A first type liquid container of the plurality of liquid containers includes a rib that projects from an outer surface of the housing. A second type liquid container of the plurality of liquid containers does not include the rib. With such a configuration, based on the existence of a specific rib provided on an outer surface of the housing, the first type liquid container can be distinguished from the second type liquid container. Therefore, compared to a plurality of liquid containers that is distinguished based on holes formed at the time of ink refilling, or text and images printed on the housing, the first type liquid container and the second type liquid container can be easily and reliably distinguished. Therefore, by setting one of the first type liquid container and the second type liquid container as a liquid container to be refilled with ink and the other one as a liquid container not to be refilled with ink, whether or not a liquid container is the liquid container to be refilled with ink can be easily and reliably identified before ink refilling. In addition, by providing a rib as the configuration for distinguishing the first type liquid container and the second type liquid container, in the first type liquid container, the rigidity of the housing can be increased.

2. In the plurality of liquid containers according to the above-described aspect, it is also possible to realize an aspect in which the housing includes a recessed portion in a same portion of the outer surface, the rib of the first type liquid container is coupled to a side surface and a bottom surface of the recessed portion and does not project further to an outside than is an opening of the recessed portion. With such a configuration, the rib provided in the first liquid container does not become an obstacle when the liquid container is attached to the liquid consuming apparatus. In addition, in the first type liquid container, since the rib exists in the recessed portion, the possibility that the rib receives a force from outside and is lost is reduced. Therefore, the possibility that the first type liquid container is falsely identified as the second type liquid container due to the loss of the rib is reduced.

3. In the plurality of liquid containers according to the above-described aspect, it is also possible to realize an aspect in which the housing includes, in a same portion of the outer surface, a plurality of terminals that comes into contact with and is electrically coupled to a plurality of terminals of the liquid consuming apparatus, respectively, and the first type liquid container includes the rib on an outer surface of the housing and on a same side as the plurality of terminals with respect to the liquid containing chamber. When the portion of the outer surface of the housing in which the plurality of terminals is provided receives an external force and is deformed, among a plurality of pairs of the plurality of respective terminals of the liquid container and the plurality of respective terminals of the liquid consuming apparatus, at least some pairs may not be able to come into contact. In the above aspect, the possibility that the portion of the outer surface of the housing in which the plurality of terminals receives an external force and is deformed is reduced by the rib. Therefore, by the rib as a configuration for distinguishing the first type liquid container and the second type liquid container, the plurality of terminals of the liquid container and the terminals of the liquid consuming apparatus can come into contact with each other more reliably.

4. In the plurality of liquid containers according to the above-described aspect, it is also possible to realize an aspect in which the housing includes, on an outer surface and in a same portion of the outer surface located on a same side as the plurality of terminals with respect to the liquid containing chamber, a lever that includes at least one of a recessed portion and a projecting portion that engages with a structure provided in the liquid consuming apparatus and elastically presses the structure, and the first type liquid container includes the rib on the outer surface of the housing and between the lever and the plurality of terminals. In the above aspect, the possibility that the portion in which the plurality of terminals is provided is deformed even when the lever that presses the liquid consuming apparatus receives a reaction force from the liquid consuming apparatus can be reduced by the rib. Therefore, even when the lever receives a reaction force from the liquid consuming apparatus, the plurality of terminals of the liquid container and the terminals of the liquid consuming apparatus can come into contact with each other more reliably.

The present disclosure can be realized in various forms other than a liquid container and a method of manufacturing a liquid container. For example, the present disclosure can be realized in the form of a method for containing a liquid in a used liquid container, a liquid filling apparatus, a method of controlling a liquid filling apparatus, a computer program for implementing the methods described above, a non-transitory recording medium in which the computer program is recorded, and the like.

What is claimed is:

1. A plurality of liquid containers configured to be attached to a same liquid consuming apparatus in an exchangeable manner, the liquid containers each comprising:

a housing that surrounds at least a part of a liquid containing chamber containing a liquid in the liquid container and is exposed to an outside of the liquid container, wherein a first type liquid container of the plurality of liquid containers includes a rib that projects from an outer surface of the housing, a second type liquid container of the plurality of liquid containers does not include the rib, the housing includes, in a same portion of the outer surface, a plurality of terminals that comes into contact with and is electrically coupled to a plurality of terminals of the liquid consuming apparatus, respectively, and the first type liquid container includes the rib on an outer surface of the housing and on a same side as the plurality of terminals with respect to the liquid containing chamber.

2. The plurality of liquid containers according to claim 1, wherein the housing includes a recessed portion in a same portion of the outer surface, and the rib of the first type liquid container is coupled to a side surface and a bottom surface of the recessed portion and does not project further to an outside than is an opening of the recessed portion.

3. The plurality of liquid containers according to claim 1, wherein the housing includes, on an outer surface and in a same portion of the outer surface located on a same side as the plurality of terminals with respect to the liquid containing chamber, a lever that includes at least one of a recessed portion and a projecting portion that engages with a structure provided in the liquid consuming apparatus and elastically presses the structure, and the first type liquid container includes the rib on the outer surface of the housing and between the lever and the plurality of terminals.

* * * * *